(12) United States Patent
Fujimatsu et al.

(10) Patent No.: US 9,357,181 B2
(45) Date of Patent: May 31, 2016

(54) TRACKING ASSISTANCE DEVICE, A TRACKING ASSISTANCE SYSTEM AND A TRACKING ASSISTANCE METHOD

(71) Applicant: Panasonic Corporation, Osaka (JP)

(72) Inventors: Takeshi Fujimatsu, Kanagawa (JP); Sonoko Hirasawa, Kanagawa (JP); Hiroyuki Yamamoto, Ishikawa (JP)

(73) Assignee: PANASONIC INTELLECTUAL MANAGEMENT CO., LTD., Osaka (JP)

( * ) Notice: Subject to any disclaimer, the term of this patent is extended or adjusted under 35 U.S.C. 154(b) by 216 days.

(21) Appl. No.: 14/326,683

(22) Filed: Jul. 9, 2014

(65) Prior Publication Data

US 2015/0016798 A1 Jan. 15, 2015

(30) Foreign Application Priority Data

Jul. 11, 2013 (JP) .................................. 2013-145287

(51) Int. Cl.
*H04N 5/77* (2006.01)
*H04N 7/18* (2006.01)
(Continued)

(52) U.S. Cl.
CPC ............ *H04N 7/181* (2013.01); *G06K 9/00362* (2013.01); *G06K 9/00718* (2013.01); *G06K 9/00771* (2013.01); *G11B 27/30* (2013.01); *G11B 27/34* (2013.01)

(58) Field of Classification Search
CPC .............. H04N 7/181; G06K 9/00362; G06K 9/00718; G06K 9/00771; G11B 27/30; G11B 27/34

USPC ................................... 386/223, 226, 230, 224
See application file for complete search history.

(56) References Cited

U.S. PATENT DOCUMENTS

| 8,457,466 B1 | 6/2013 | Sharma et al. |
| 2004/0257444 A1 | 12/2004 | Maruya et al. |

(Continued)

FOREIGN PATENT DOCUMENTS

| GB | 2482127 | 1/2012 |
| JP | 2005-012415 | 1/2005 |

(Continued)

OTHER PUBLICATIONS

Russia Office action in Russian Patent Applcation No. 2014128335, dated Feb. 6, 2015, along with an English translation thereof.

(Continued)

*Primary Examiner* — Robert Chevalier
(74) *Attorney, Agent, or Firm* — Greenblum & Bernstein, P.L.C.

(57) ABSTRACT

A tracking assistance device includes: a target-to-be-tracked setting unit that, in response to an input operation performed by a monitoring person on one of display views to designate a moving object to be tracked, sets the designated moving object as a target to be tracked, the display views displaying captured images taken by respective cameras and stored in a recorder; a camera selection unit that, based on tracing information obtained by processing the captured images, selects any of the cameras inferred to have taken an image of the moving object designated as the target to be tracked from among the cameras other than the camera corresponding to the display view on which the target to be tracked was designated; and a playback unit that causes the captured images taken by each camera selected by the camera selection unit to be displayed in a corresponding one of the display views.

7 Claims, 14 Drawing Sheets

(51) Int. Cl.
*G06K 9/00* (2006.01)
*G11B 27/30* (2006.01)
*G11B 27/34* (2006.01)

(56) References Cited

U.S. PATENT DOCUMENTS

| | | | |
|---|---|---|---|
| 2006/0279628 A1* | 12/2006 | Fleming | G11B 27/034 348/143 |
| 2008/0130949 A1 | 6/2008 | Ivanov et al. | |
| 2008/0292140 A1 | 11/2008 | Morris et al. | |
| 2008/0304706 A1* | 12/2008 | Akisada | G06K 9/00771 382/103 |
| 2010/0002082 A1 | 1/2010 | Buehler et al. | |
| 2010/0097475 A1 | 4/2010 | Yokomitsu | |
| 2014/0240511 A1* | 8/2014 | Nystrom | H04N 5/33 348/164 |

FOREIGN PATENT DOCUMENTS

| | | |
|---|---|---|
| JP | 2006-146378 | 6/2006 |
| JP | 2007-272732 | 10/2007 |
| JP | 2009-098774 | 5/2009 |
| JP | 2010-268186 | 11/2010 |

OTHER PUBLICATIONS

Germany Office action in German Patent Applcation No. 102014213554.0, dated Mar. 13, 2015.

U.S. Appl. No. 14/326,510 to Takeshi Fujimatsu et al., filed Jul. 9, 2014.

U.S. Appl. No. 14/326,690 to Sonoko Hirasawa et al., filed Jul. 9, 2014.

* cited by examiner

TRACKING ASSISTANCE DEVICE, A TRACKING ASSISTANCE SYSTEM AND A TRACKING ASSISTANCE METHOD

TECHNICAL FIELD

The present invention relates a tracking assistance device, a tracking assistance system and a tracking assistance method for assisting a monitoring person in performing a task of tracking a moving object to be tracked by displaying on a display device a screen in which multiple display sections are arranged to display captured images taken by respective cameras and stored in an image storage device.

BACKGROUND OF THE INVENTION

Some of the widely used monitoring systems include multiple cameras set up in a monitored area and a monitor adapted to display a monitoring screen in which multiple display sections are arranged to display captured images taken by respective cameras so that a monitoring person can monitor the monitored area. In such a monitoring system, by storing the captured images taken by the cameras in a recorder, it is possible to enable the monitoring person to check, after an illicit act such as shoplifting was detected, what actions were performed in the monitored area by the person who committed the illicit act.

In a case where the monitoring person keeps track of a person while watching the multiple display sections in the screen as mentioned above, the monitoring person is required to determine the display section in which the person will appear (or be displayed) next from the direction of movement of the person being monitored, but if it took much time to determine the next display section, the monitoring person may lose sight of the person to be monitored. Therefore, a configuration to reduce the burden of the monitoring person and allow tracking of a person to be carried out smoothly is demanded.

With regard to such a demand, a technology is conventionally known in which based on information such as a direction of movement of a person being monitored, the camera that will next capture the image of the person is selected, and the display section displaying the captured image taken by this camera is displayed adjacent to the display section in which the person being monitored currently appears (refer to JP2005-012415A). A technology is also known in which a monitoring screen is displayed such that the monitoring screen includes a map image representing a monitored area, on which images representing cameras (camera marks) and display sections for displaying the captured images taken by the cameras are arranged (refer to JP2010-268186A).

The process of selecting the camera that will next capture the image of the person being monitored as in the technology disclosed in JP2005-012415A may be performed based on tracing information obtained by a tracing processing device which traces a moving object(s) detected from the captured images taken by the cameras. However, if the tracing information includes an error, the person being monitored may be lost from tracking. Thus, a configuration which, when an error is found in the tracing information during a process in which the monitoring person tracks a person while watching a screen, can allow the monitoring person to correct the tracing information without imposing a significant burden on the monitoring person is demanded.

With regard to such a demand, a technology is known in which a tracing device is configured to perform a tracing process using a point of interest set on a moving object and, if the tracing of the point of interest becomes difficult, change the point of interest in accordance with a correction instruction input by a user (monitoring person) to thereby continue the tracing process (refer to JP2007-272732A).

SUMMARY OF THE INVENTION

In the technique disclosed in JP2005-012415A, since the camera that will next capture the image of the person being monitored (next camera) is predicted and the captured image taken by this camera is displayed, the burden of the monitoring person may be reduced. However, if there is another person in addition to the person being monitored in the captured image taken by the camera that is currently capturing the image of the person being monitored, the prediction of the next camera may be performed based on the direction of movement of the other person. In such a case, the prediction of the next camera is not made correctly, and this may result in the monitoring person losing sight of the person being monitored.

On the other hand, in the technology disclosed in JP2010-268186A, the positional relationship between the cameras on the map image enables the monitoring person to predict to a certain extent the display section in which the person being monitored will appear next, and thus, the burden of the monitoring person can be reduced somewhat. However, in a case where many display sections are arranged in the screen in correspondence with the number of cameras installed, it is difficult to determine the display section in which the person being monitored currently appears promptly and exactly from among the many display sections, and thus, the burden of the monitoring person may still be high and there remains a high chance that the person being monitored can be lost from tracking.

Further, in the technology disclosed in JP2007-272732A, even under circumstances in which it is difficult for the tracing device to perform a tracing process, with a help of the monitoring person, the tracing process can be continued without interruption. However, this prior at technology only relates to an intra-camera tracing process performed based on the captured images taken by a single camera. On the other hand, an error can occur in an inter-camera tracing process which associates the tracing information obtained by the intra-camera tracing process for one camera with the tracing information obtained by the intra-camera tracing process for another, and if an error actually occurs in the inter-camera tracing process, a change of the person to be tracked may inadvertently occur. The prior art technology does not provide any effective measure to deal with an error that may occur in the inter-camera tracing process.

The present invention is made to solve such problems of the prior art, and a primary object of the present invention is to provide a tracking assistance device, a tracking assistance system and a tracking assistance method which, in a case where a monitoring person keeps track of a specific person while watching captured images taken by multiple cameras, can properly perform an assistance process to reduce the burden of the monitoring person to thereby enable the monitoring person to smoothly carry out the tracking work without losing sight of the person being monitored.

To achieve the foregoing object, a first aspect of the present invention provides a tracking assistance device for assisting a monitoring person in performing a task of tracking a moving object to be tracked by displaying on a display device a screen in which a plurality of display views for displaying captured images taken by respective cameras and stored in an image storing unit are arranged on a map image representing a monitored area in accordance with an actual arrangement of the cameras, including: a target-to-be-tracked setting unit that causes the captured images stored in the image storing unit to be displayed in the display views in accordance with a specified search condition such as a capture time, and, in response to an input operation performed by the monitoring person on one of the display views to designate a moving object to be tracked, sets the designated moving object as a target to be tracked; a camera selection unit that, based on tracing information obtained by processing the captured images, selects any of the cameras inferred to have taken an image of the moving object designated as the target to be tracked from among the cameras other than the camera corresponding to the display view on which the target to be tracked was designated; a confirmation image presenting unit that, based on the tracing information relating to the moving object set as the target to be tracked, extracts, from among the captured images taken by each camera selected by the camera selection unit, a confirmation image which is a captured image taken by each camera selected by the camera selection unit when tracing of the moving object was started and supposed to include the moving object, and causes the display device to display a target-to-be-tracked confirmation screen in which the confirmation image(s) is(are) arranged; and a playback unit that performs continuous playback in which the captured images from which the confirmation image(s) is(are) extracted by the confirmation image presenting unit are displayed in the plurality of display views sequentially along with passage of time.

According to this structure, a screen is displayed on the display device such that multiple display views for displaying captured images taken by respective cameras are arranged on the map image representing the monitored area in accordance with an actual arrangement of the cameras, and the moving object designated as a target to be tracked is displayed in these display views, and therefore, the monitoring person can easily check what actions were performed in the monitored area by the moving object designated as the target to be tracked. Particularly, since a confirmation image(s) supposed to include the moving object set as the target to be tracked are displayed in the display views based on the tracing information, by checking whether each confirmation image actually includes the moving object designated as the target to be tracked, the monitoring person can easily determine whether the tracing information relating to the moving object designated as the target to be tracked includes an error.

In a second aspect of the present invention, the tracking assistance device further includes a screen generation unit including: a target-to-be-tracked indicating unit that provides first highlighting to highlight a moving object frame associated with the moving object set as the target to be tracked; and a display view indicating unit that provides a second highlighting to highlight a display frame associated with the display view in which the moving object set as the target to be tracked currently appears in a continuous playback screen in which the continuous playback is performed.

According to this structure, when a user (monitoring person) keeps track of the moving object designated as the target to be tracked while watching the captured images taken by multiple cameras and displayed on the screen, the monitoring person can find at a glance the display view in which the moving object designated as the target to be tracked appears from among the multiple display views, and therefore, the burden of the monitoring person performing the tracking task can be reduced and the tracking task can be carried out smoothly without losing sight of the moving object designated as the target to be tracked.

In a third aspect of the present invention, in a case where tracing of the moving object set as the target to be tracked is interrupted in the tracing information, the display view indicating unit simultaneously indicates two of the display views that display captured images including the moving object set as the target to be tracked respectively before and after a period in which the tracing is interrupted.

When tracing of the moving object designated as the target to be tracked is interrupted, the display view in which the moving object designated as the target to be tracked currently appears cannot be identified, but it is probable that the moving object designated as the target to be tracked appears in one or both of the two display views that display the moving object before and after the period in which the tracing is interrupted, respectively. According to the above structure, the two display views are simultaneously indicated, whereby the monitoring person can carry out the tracking task without losing sight of the moving object.

In a fourth aspect of the present invention, the tracking assistance device further includes: a candidates selection unit that, when there is an error in the tracing information relating to the moving object set as the target to be tracked, selects, as a candidate(s), a moving object(s) having a high degree of relevance with the moving object set as the target to be tracked based on the tracing information; a candidate image presenting unit that extracts, as a candidate image(s), a captured image(s) in which the moving object(s) selected as the candidate(s) is(are) included, and causes the display device to display a candidate selection screen in which the candidate image(s) is(are) arranged such that the monitoring person selects on the candidate selection screen a candidate image in which the moving object designated as the target to be tracked is included; and a tracing information correction unit that changes the target to be tracked to the moving object included in the candidate image selected on the candidate selection screen, and corrects the tracing information relating to the moving object designated as the target to be tracked.

According to this structure, the monitoring person is only required to select a candidate image in which the moving object designated as the target to be tracked appears, and therefore, correction of the tracing information relating to the moving object designated as the target to be tracked can be made easily and the burden of the monitoring person can be reduced.

In a fifth aspect of the present invention, processes performed by the camera selection unit and the playback unit are performed with regard to events occurring before, after, or both before and after a capture time of a target-to-be-tracked designation image on which the monitoring person designated the moving object to be tracked.

According to this structure, the monitoring person can grasp the state of the moving object before the time when the moving object was designated as the target to be tracked and/or the state of the moving object after the time when the moving object was designated.

In a sixth aspect of the present invention, there is provided a tracking assistance system for assisting a monitoring person in performing a task of tracking a moving object to be tracked by displaying on a display device a screen in which a plurality of display views for displaying captured images taken by respective cameras and stored in an image storing unit are arranged on a map image representing a monitored area in accordance with an actual arrangement of the cameras, including: the cameras taking images of the monitored area; the display device displaying the screen; and a plurality of information processing devices, wherein the plurality of information processing devices jointly include: a tracing processing unit that traces a moving object(s) detected from the captured images taken by the cameras and generates tracing information of each moving object; a target-to-be-tracked setting unit that causes the captured images stored in the image storing unit to be displayed in the display views in accordance with a specified search condition such as a capture time and, in response to an input operation performed by the monitoring person on one of the display views to designate a moving object to be tracked, sets the designated moving object as a target to be tracked; a camera selection unit that, based on the tracing information obtained from the tracing processing unit, selects any of the cameras inferred to have taken an image of the moving object designated as the target to be tracked from among the cameras other than the camera corresponding to the display view on which the target to be tracked was designated; a confirmation image presenting unit that, based on the tracing information relating to the moving object set as the target to be tracked, extracts, from among the captured images taken by each camera selected by the camera selection unit, a confirmation image which is a captured image taken by each camera selected by the camera selection unit when tracing of the moving object was started and supposed to include the moving object, and causes the display device to display a target-to-be-tracked confirmation screen in which the confirmation image(s) is(are) arranged; and a playback unit that performs continuous playback in which the captured images from which the confirmation image(s) is(are) extracted by the confirmation image presenting unit are displayed in the plurality of display views sequentially along with passage of time.

According to this structure, similarly to the structure according to the first aspect of the present invention mentioned above, in a case where the monitoring person keeps track of a specific moving object while watching captured images taken by multiple cameras and displayed on the screen of the display device, it is possible to properly perform an assistance process to reduce the burden of the monitoring person to thereby enable the monitoring person to carry out the tracking task smoothly without losing sight of the moving object to be tracked.

In a seventh aspect of the present invention, there is provided a tracking assistance method for assisting a monitoring person in performing a task of tracking a moving object to be tracked by displaying on a display device a screen in which a plurality of display views for displaying captured images taken by respective cameras and stored in an image storing unit are arranged on a map image representing a monitored area in accordance with an actual arrangement of the cameras, including: a step of causing the captured images stored in the image storing unit to be displayed in the display views in accordance with a specified search condition such as a capture time, and, in response to an input operation performed by the monitoring person on one of the display views to designate a moving object to be tracked, setting the designated moving object as a target to be tracked; a step of selecting, based on tracing information obtained by processing the captured images, any of the cameras inferred to have taken an image of the moving object designated as the target to be tracked from among the cameras other than the camera corresponding to the display view on which the target to be tracked was designated; a step of, based on the tracing information relating to the moving object set as the target to be tracked, extracting, from among the captured images taken by each camera selected by the step of selecting, a confirmation image which is a captured image taken by each camera selected by the step of selecting when tracing of the moving object was started and supposed to include the moving object, and causing the display device to display a target-to-be-tracked confirmation screen in which the confirmation image(s) is(are) arranged; and a step of performing continuous playback in which the captured images from which the confirmation image(s) is(are) extracted by the step of extracting are displayed in the plurality of display views sequentially along with passage of time.

According to this structure, similarly to the structure according to the first aspect of the present invention mentioned above, in a case where the monitoring person keeps track of a specific moving object while watching captured images taken by multiple cameras and displayed on the screen of the display device, it is possible to properly perform an assistance process to reduce the burden of the monitoring person to thereby enable the monitoring person to carry out the tracking task smoothly without losing sight of the moving object to be tracked.

BRIEF DESCRIPTION OF THE DRAWINGS

Now the present invention is described in the following in terms of preferred embodiments thereof with reference to the appended drawings, in which.

DETAILED DESCRIPTION OF THE PREFERRED EMBODIMENTS

In the following, embodiments of the present invention will be described with reference to the drawings. In the following description, the terms "tracking" and "tracing" having substantially the same meaning are coexistent. This is only for the sake of convenience of explanation. The term "tracking" is mainly used in the description of a configuration closely related to a monitoring person, while the term "tracing" is mainly used in the description of a configuration closely related to an internal function/process of the device.

Figure 1:
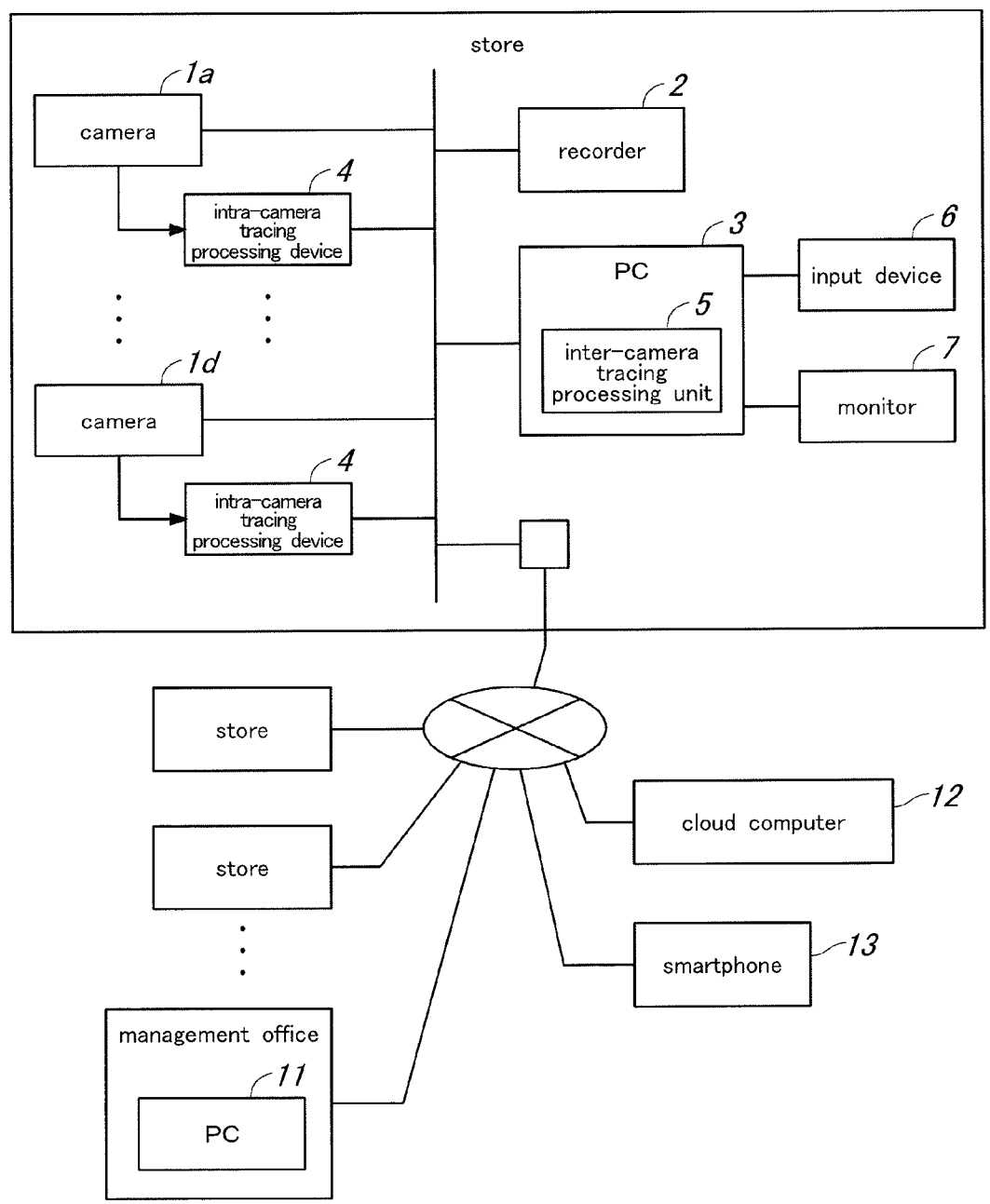
FIG. 1 is a diagram showing an overall configuration of a tracking assistance system according to an embodiment of the present invention.

FIG. 1 is a diagram showing an overall configuration of a tracking assistance system according to the present embodiment. This tracking assistance system is configured for use in a retail store such as a supermarket, a DIY store or the like, and includes cameras 1a-1d, a recorder (image storing unit) 2, a PC (Personal computer) (tracking assistance device) 3 and an intra-camera tracing processing device 4.

The cameras 1a-1d are mounted at appropriate positions in a store to capture images of a monitored area in the store, and image information obtained thereby is recorded in the recorder 2.

The PC 3 is connected with an input device 6 such as a mouse for the monitoring person to perform a variety of input operations, and a monitor (display device) 7 on which a monitoring screen is displayed. It is to be noted that the input device 6 and the monitor 7 may be embodied as a touch panel display.

The PC 3 is set up in a security station or the like of the store, such that the monitoring person (such as a security guard) can view the real-time images of an interior of the store taken by the cameras 1a-1d shown in the monitoring screen displayed on the monitor 7 or the past images of the interior of the store recorded in the recorder 2.

A PC 11 installed in a management office is also connected with a monitor not shown in the drawings, such that a user at the management office can check the situation in the store by viewing the real-time images of the interior of the store taken by the cameras 1a-1d or the past images of the interior of the store recorded in the recorder 2.

The intra-camera tracing processing devices 4 perform a process of tracing a person(s) (moving object) detected from the captured images taken by respective cameras 1a-1d and generating tracing information (intra-camera tracing information) for each person. This intra-camera tracing process may be performed by use of known image recognition technology (human detection technology, person tracking technology, etc.).

The PC 3 further includes an inter-camera tracing processing unit 5. The inter-camera tracing processing unit 5 performs a process of obtaining the intra-camera tracing information from the intra-camera tracing processing devices 4 and associating the persons detected from the captured images taken by the cameras 1a-1d by the intra-camera tracing process with each other, so that it is possible to continuously trace a person across the captured images taken by different ones of the multiple cameras 1a-1d.

In the present embodiment, each intra-camera tracing processing device 4 is configured to perform the intra-camera tracing process at all times independently of the PC 3. However, the tracing process may be performed in response to an instruction from the PC 3. Further, though it is preferred that each intra-camera tracing processing device 4 perform the tracing process for all persons detected from the captured images taken by the corresponding camera, the tracing process may be performed only with respect to the person designated as a target to be tracked and a person(s) who is highly related to this person.

Figure 2:
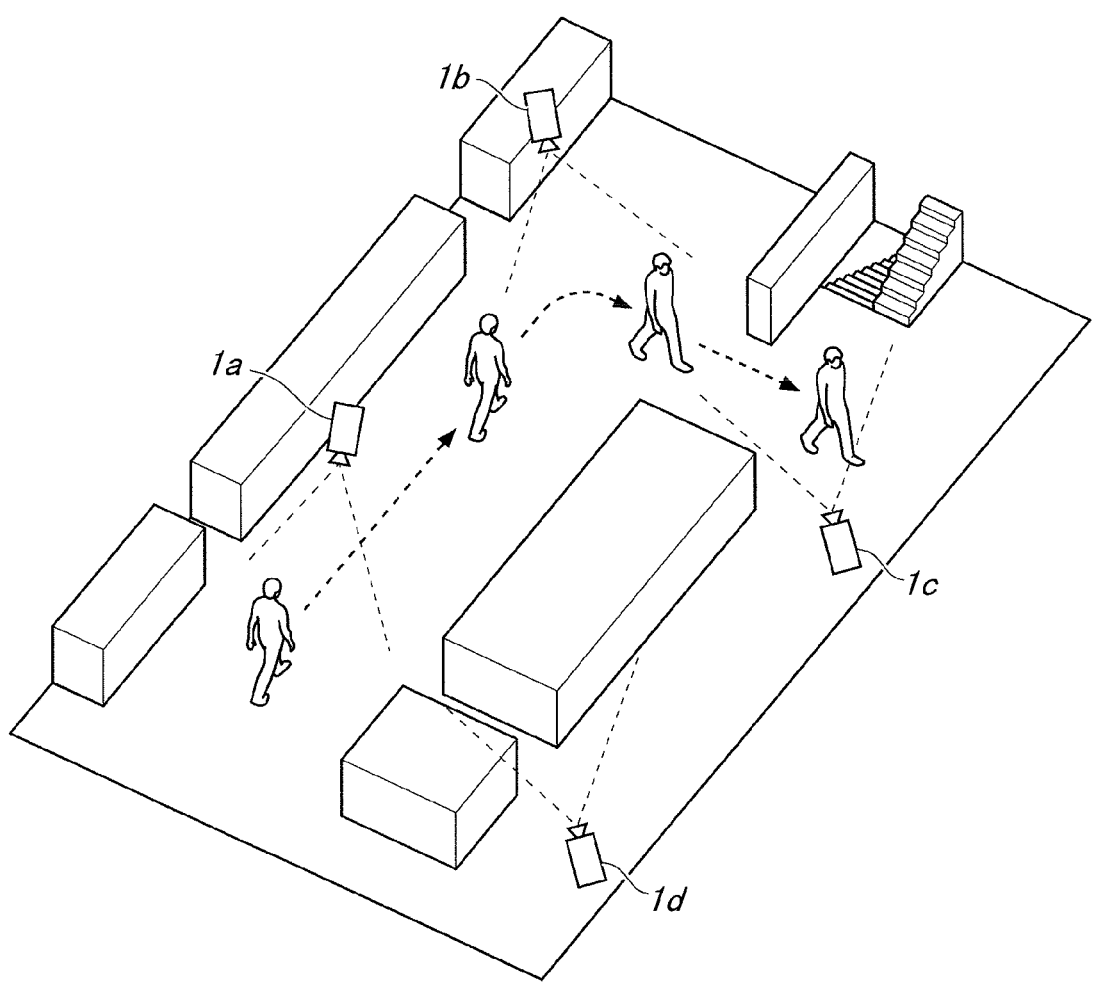
FIG. 2 is a perspective view showing an arrangement of cameras 1a-1d in a store.

FIG. 2 is a perspective view showing an arrangement of the cameras 1a-1d in the store. In the illustrated monitored area in the store, passages are provided between item display spaces, and the first to forth cameras 1a-1d are mounted to mainly capture images of these passages.

When a person moves through a passage, the image of the person is captured by one or more of the first to forth cameras 1a-1d, and the camera(s) capturing the image of the person changes along with the movement of the person. In the present embodiment, a description will be made of an example in which the person moves such that the image of the person is captured by the first to third cameras 1a-1c in the order of the first camera 1a, second camera 1b and third camera 1c, though the path of movement of the person is not limited to this example.

Figure 3:
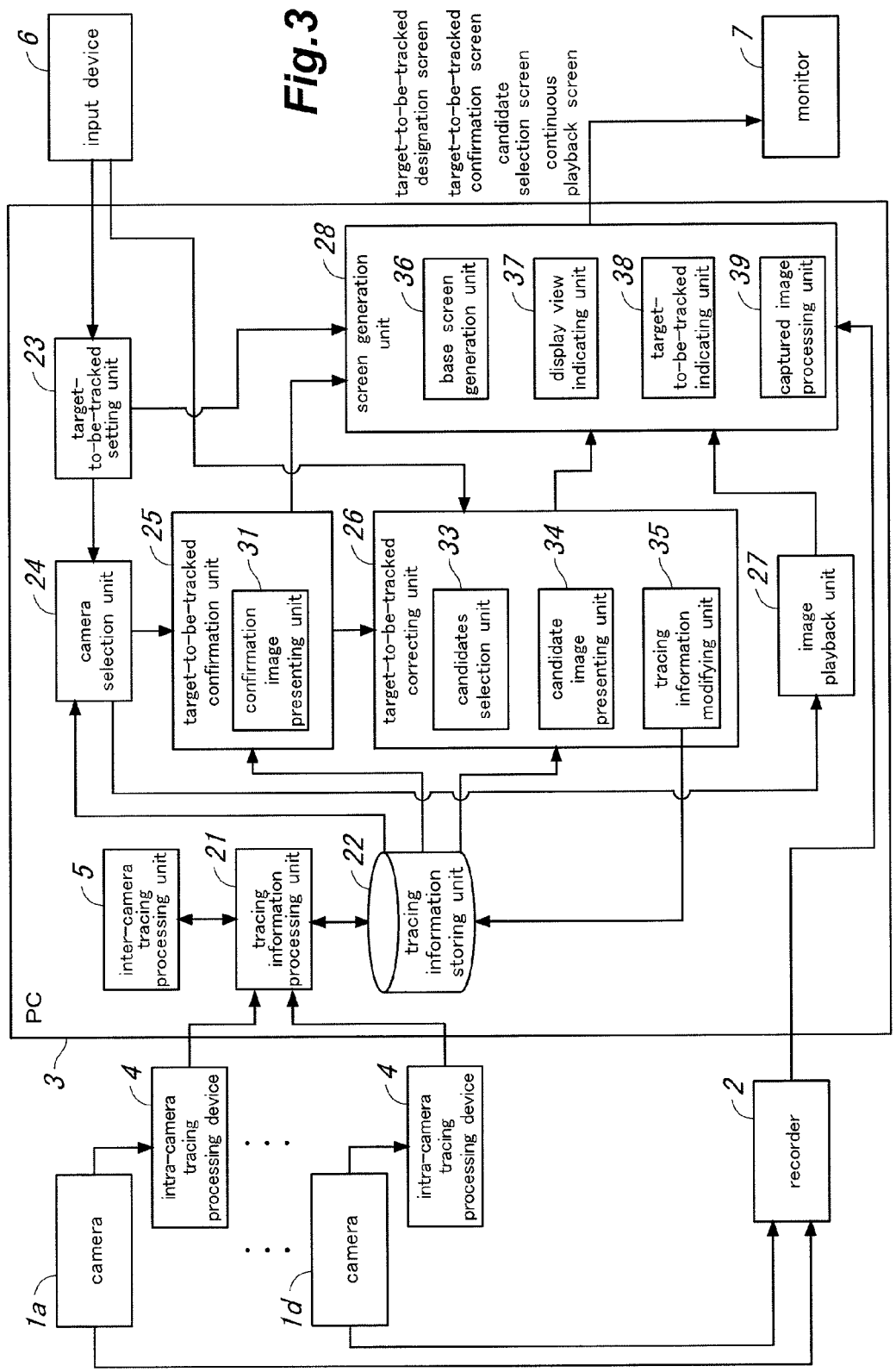
FIG. 3 is a functional block diagram schematically showing a configuration of a PC 3.

Next, a description will be given of the tracking assistance process performed by the PC 3 shown in FIG. 1. FIG. 3 is a functional block diagram schematically showing a configuration of the PC 3. FIGS. 4-7 are explanatory diagrams showing screens displayed on the monitor 7. First, an outline of the screens shown in FIGS. 4-7 will be explained.

Figure 4:
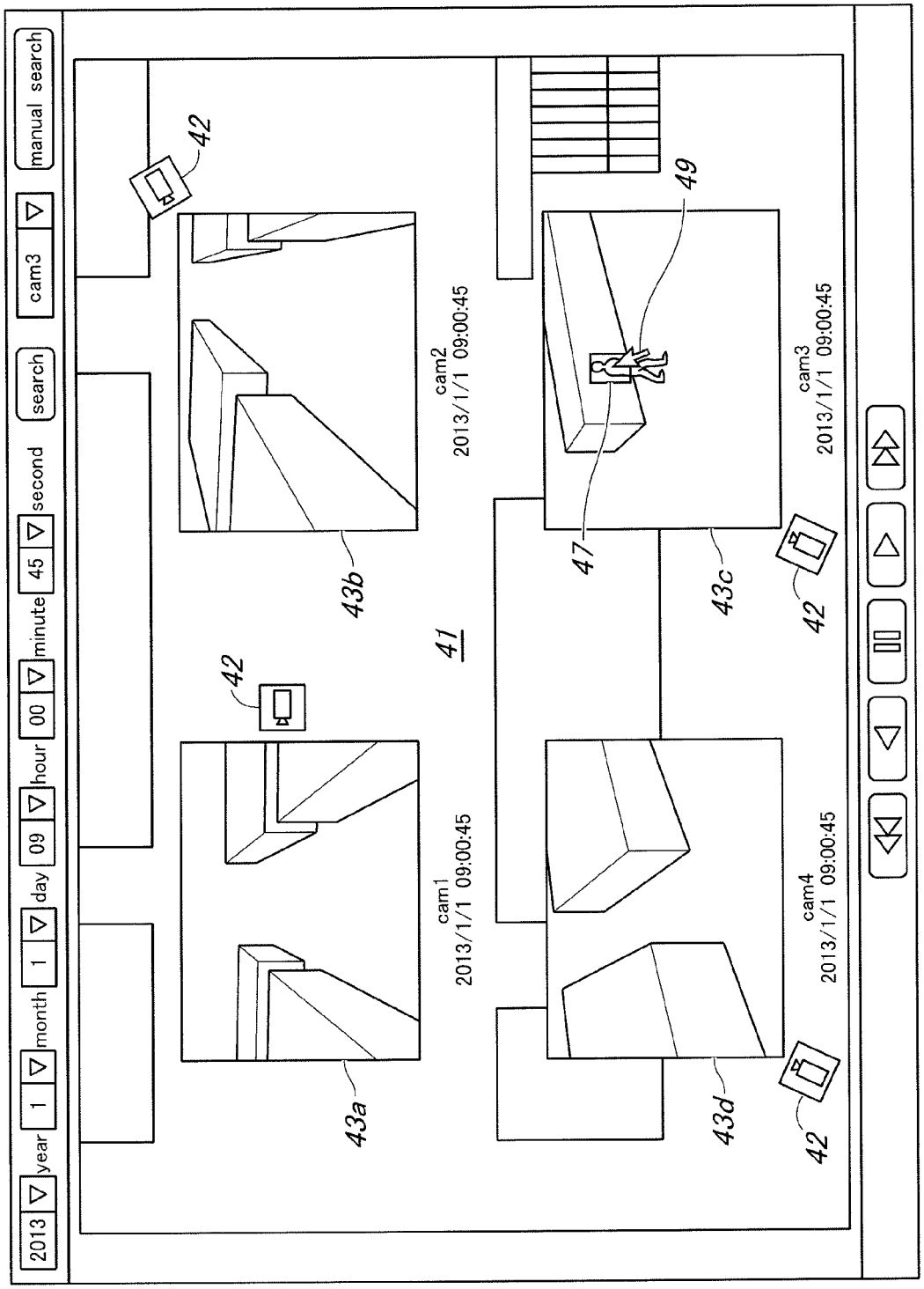
FIG. 4 is an explanatory diagram showing a target-to-be-tracked designation screen to be displayed on a monitor 7.
Figure 5:
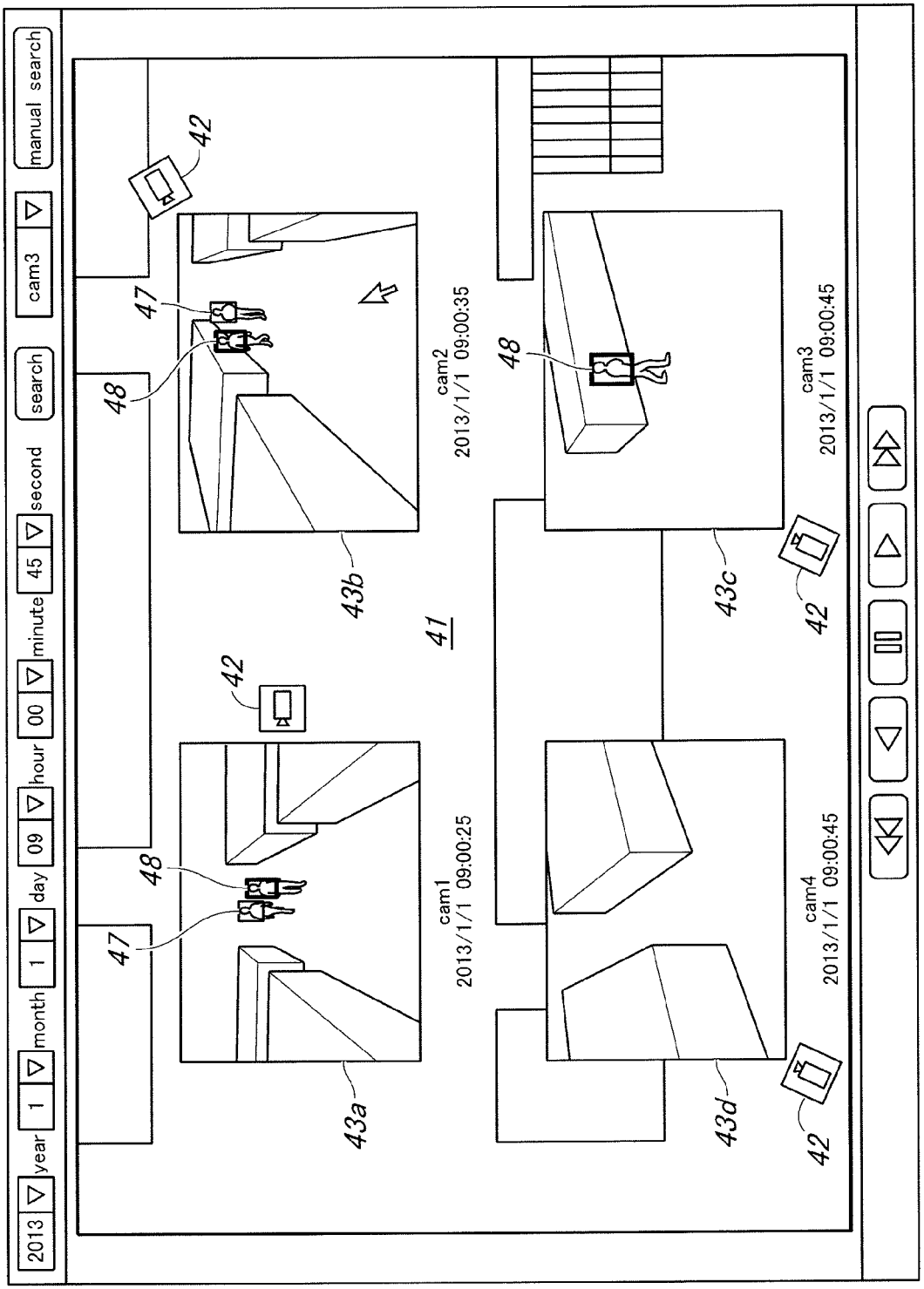
FIG. 5 is an explanatory diagram showing a target-to-be-tracked confirmation screen to be displayed on the monitor 7.
Figure 6:
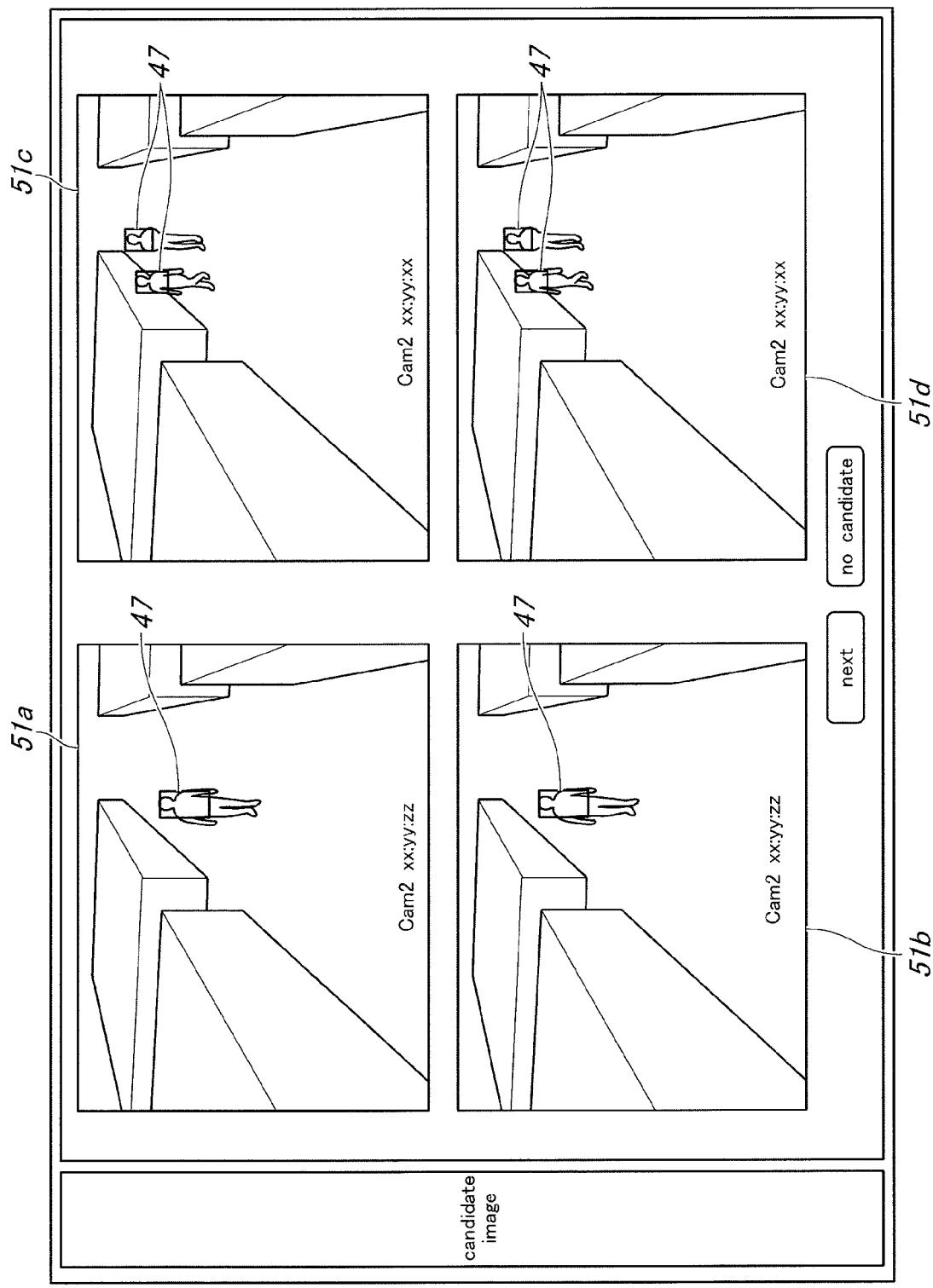
FIG. 6 is an explanatory diagram showing a candidate selection screen to be displayed on the monitor 7.
Figure 7A:
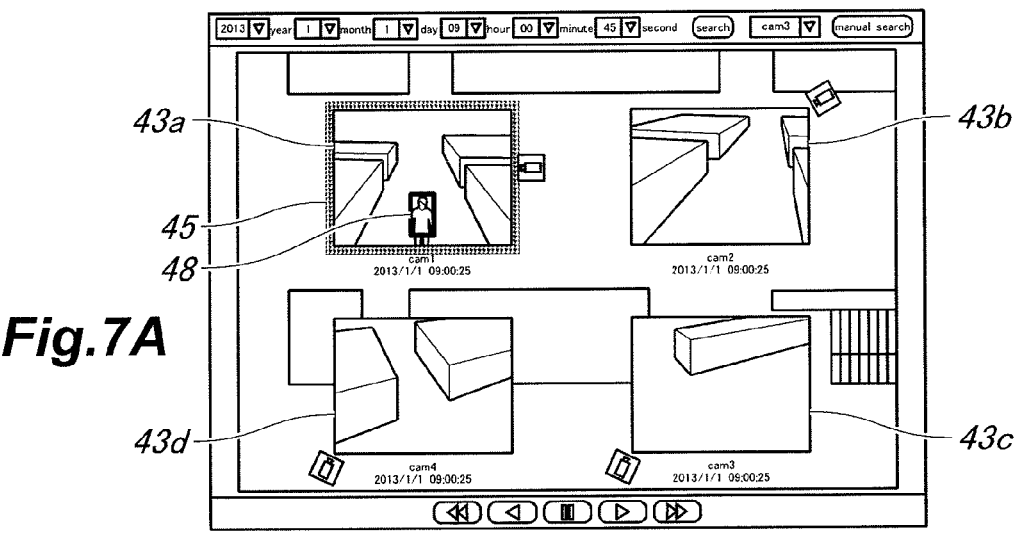
FIGS. 7A-7C are explanatory diagrams showing a continuous playback screen to be displayed on the monitor 7.
Figure 7B:
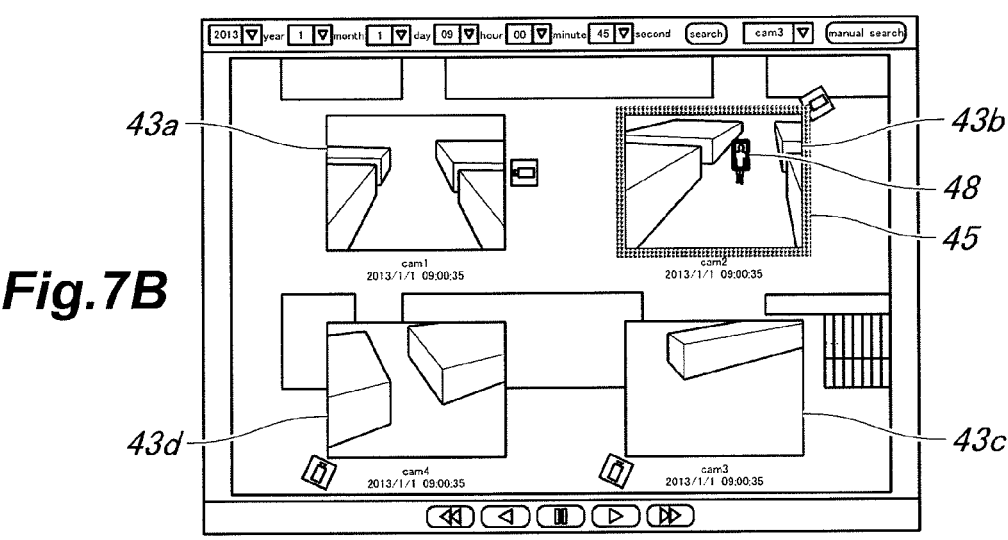
Figure 7C:
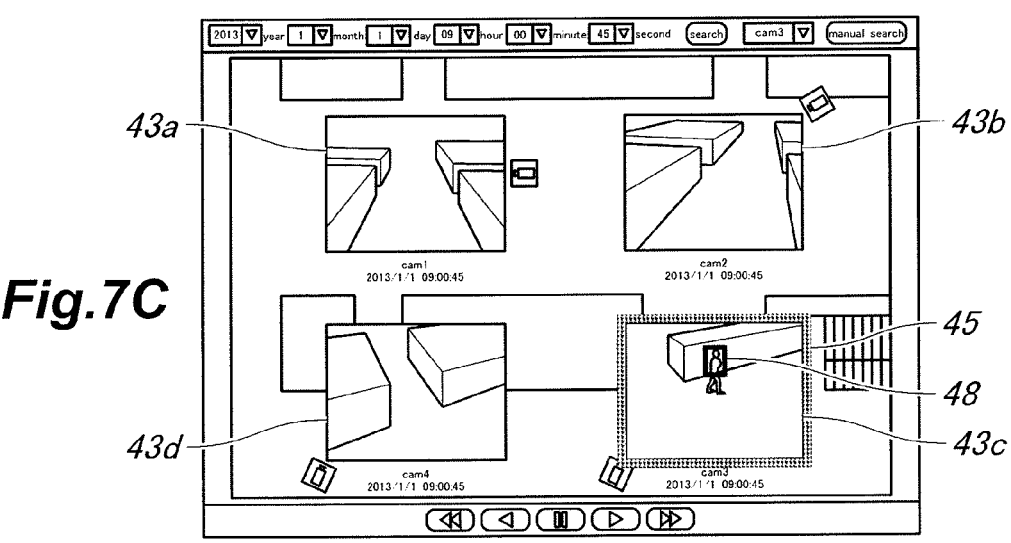

FIG. 4 shows a target-to-be-tracked designation screen, which allows a user (monitoring person) to designate a person desired to be tracked on the captured images at the date and time when the person committed an illicit act such as shoplifting. FIG. 5 shows a target-to-be-tracked confirmation screen which includes confirmation images extracted based on the tracing information obtained by the intra-camera tracing processing device 4 and the inter-camera tracing processing unit 5 to allow the monitoring person to check whether the tracing information includes an error. FIG. 6 shows a candidate selection screen, which displays multiple candidate images, namely, images in which candidates for the person designated as the target to be tracked are included respectively, so that the monitoring person can select the candidate image in which the person designated as the target to be tracked is included. FIG. 7 includes FIGS. 7A-7C and shows a continuous playback screen for performing continuous playback where captured images in which the object (person) to be tracked is included are displayed sequentially along with the passage of time.

In the screens shown in FIGS. 4, 5 and 7, camera marks (images depicting cameras) 42 for respective cameras 1a-1d are arranged on a map image 41 representing the monitored area at locations in accordance with the actual arrangement of the cameras 1a-1d. Further, multiple display views (display sections) 43a-43d displaying the captured images taken by the respective cameras 1a-1d are arranged in the vicinity of the respective camera marks 42.

The camera marks 42 are displayed at angles to indicate the imaging direction of the respective cameras 1a-1d, whereby the monitoring person can roughly know the imaging regions of the cameras 1a-1d. The display views 43a-43d are arranged at locations substantially corresponding to the imaging reasons of the respective cameras 1a-1d, whereby the monitoring person can roughly know which part of the monitored area represented by the map image 41 is displayed in each of the display views 43a-43d.

Further, in the screens shown in FIGS. 4-7, each person detected in the captured images displayed in the display views 43a-43d is shown with a person detection frame 47. In addition, the person set as the target to be tracked is displayed with a person detection frame 48 indicating that the person is the target to be tracked. This person detection frame 48 is highlighted with a color (for example, green) to distinguish the person detection frame 48 from the person detection frames 47 shown in association with the other persons detected.

Next, a description will be given of each unit of the PC 3 shown in FIG. 3. The PC 3 includes, in addition to the inter-camera tracing processing unit 5, a tracing information processing unit 21, a tracing information storing unit 22, a target-to-be-tracked setting unit 23, a camera selection unit 24, a target-to-be-tracked confirmation unit 25, a target-to-be-tracked correction unit 26, an image playback unit 27 and a screen generation unit 28.

The tracing information processing unit 21 performs a process of obtaining tracing information from the intra-camera tracing processing devices 4 and the inter-camera tracing processing unit 5 and storing the tracing information in the tracing information storing unit 22.

The target-to-be-tracked setting unit 23 performs a process of displaying on the monitor 7 a target-to-be-tracked designation screen in which the captured images stored in the recorder 2 are displayed in the display views 43a-43d and, in response to an input operation performed by the monitoring person on one of the display views 43a-43d to designate a person to be tracked, setting the designated person as the target to be tracked. This input operation of the monitoring person is performed using the input device 6 such as a mouse. It is to be noted that the captured image displayed in one of the display views 43a-43d on which the operation to designate the object (person) to be tracked was performed will be referred to hereinafter as a target-to-be-tracked designation image.

The camera selection unit 24 performs a process of obtaining the tracing information relating to the person set as the target to be tracked from the tracing information storing unit 22 and, based on the tracing information, selecting any of the cameras 1a-1d which are inferred to have taken the image of the person set as the target to be tracked other than one of the cameras 1a-1d which corresponds to one of the display views 43a-43d on which the target to be tracked was designated.

The target-to-be-tracked confirmation unit 25 includes a confirmation image presenting unit 31. The confirmation image presenting unit 31 performs a process of obtaining the tracing information relating to the person set as the target to be tracked from the tracing information storing unit 22 and, based on the tracing information, extracting captured images supposed to include the person as confirmation images, such that a target-to-be-tracked confirmation screen in which the confirmation images are arranged is displayed on the monitor. In the process of extracting the confirmation images, based on the tracing information, captured images supposed to include the person set as the target to be tracked are retrieved from the recorder 2.

Thereby, by checking whether each confirmation image displayed in the target-to-be-tracked confirmation screen relates to the person designated as the target to be tracked, the monitoring person can determine whether the tracing information relating to the person designated as the target to be tracked includes an error.

If some confirmation image is found to relate to a person(s) different from the person designated as the target to be tracked, namely, if the confirmation image includes only a person(s) different from the person designated as the target to be tracked, or if the confirmation image includes the person designated as the target to be tracked but the person detection frame 48 indicating the target to be tracked is displayed in association with a person different from the person designated as the target to be tracked, the tracing information relating to the person designated as the target to be tracked includes an error.

The target-to-be-tracked correction unit 26 includes a candidates selection unit 33, a candidate image presenting unit 34 and a tracing information correction unit 35.

The candidates selection unit 33 performs a process of obtaining the tracing information of each person from the tracing information storing unit 22 and, based on the tracing information, selecting, as candidates, persons who are highly related to the person set as the target to be tracked. This candidates selection process is performed in response to an instruction operation performed by the monitoring person when the monitoring person finds that there is an error in the tracing information relating to the person designated as the target to be tracked. In the candidates selection process, a degree of relevance of each person is obtained based on a detection time of the person (capture time of image frame), a detection position of the person, a moving velocity of the person, color information of the person's image, etc. The color information of each person's image is obtained by a method of extracting colors by use of templates. Further, the candidates selection unit 33 rank the persons selected as candidates (hereinafter, candidate persons) in accordance with their respective degrees of relevance.

The candidate image presenting unit 34 performs a process of extracting, for each person selected as a candidate in the candidates selection unit 33, a captured image in which the person is included (this captured image may be referred to as a candidate image) and displaying on the monitor 7 a candidate selection screen in which the candidate images are arranged so that the monitoring person can select on the candidate selection screen a candidate image in which the person designated as the target to be tracked is included. In the process of extracting the candidate image, based on the tracing information relating to each candidate person, a captured image in which the candidate person is included is obtained from the recorder 2.

Specifically, in the present embodiment, a process is performed to obtain, from the tracing information stored in the tracing information storing unit 22, the capture time of the target-to-be-tracked designation image and each candidate image and the identification information of the cameras 1a-1d that captured these images, and arrange the target-to-be-tracked designation image and the candidate images on the candidate selection screen such that they are arranged in the order of capture time and grouped based on the cameras 1a-1d by which these images were taken. Further, the candidate image presenting unit 34 performs a process of obtaining, from the tracing information relating to each person selected as a candidate, a tracing period of the person, and displaying an image representing the tracing period in association with the corresponding candidate image in the candidate selection screen. Also, the candidate image presenting unit 34 performs a process of causing the captured images to be displayed as still images in the initial state of the candidate selection screen, and upon an instruction operation by the monitoring person, causing the captured images to be displayed as moving images.

The tracing information correction unit 35 performs a process of changing the target to be tracked to the person associated with the candidate image selected on the candidate selection screen and correcting the tracing information relating to the person designated as the target to be tracked. Namely, when the person indicated as the target to be tracked in any one of the aforementioned confirmation images is different from the person designated as the target to be tracked, it is considered that inadvertent change of the person set as the target to be tracked has occurred, and thus, based on the tracing information relating to the person set as the correct target to be tracked, the tracing information relating to the person designated as the target to be tracked is corrected. The tracing information corrected thereby is stored in the tracing information storing unit 22.

It is to be noted that each of above-described processes performed by the camera selection unit 24, the target-to-be-tracked confirmation unit 25 and the target-to-be-tracked correction unit 26 are performed with respect to the events occurring temporally before, after, or both before and after the capture time of the target-to-be-tracked designation image on which the monitoring person designated the person to be tracked.

The image playback unit 27 performs a process to display the captured images of the cameras 1a-1d selected by the camera selection unit 24 in the corresponding display views 43a-43d. In particular, in the present embodiment, the image playback unit 27 performs a process of continuous playback such that captured images in which the person designated as the target to be tracked is included are displayed in the display views 43a-43d sequentially along with the passage of time.

The screen generation unit 28 generates screens to be displayed on the monitor 7, and includes a base screen generation unit 36, a display view indicating unit 37, a target-to-be-tracked indicating unit 38 and a captured image processing unit 39.

The screen generation unit 28 generates the target-to-be-tracked designation screen shown in FIG. 4 in response to an instruction from the target-to-be-tracked setting unit 23, generates the target-to-be-tracked confirmation screen shown in FIG. 5 in response to an instruction from the confirmation image presenting unit 31, generates the candidate selection screen shown in FIG. 6 in response to an instruction from the candidate image presenting unit 34 and generates the continuous playback screen shown in FIG. 7 in response to an instruction from the image playback unit 27.

The base screen generation unit 36 performs a process of generating a base screen (background screen) in which the camera marks 42 for the respective cameras 1a-1d and blank frames (not including the captured images) of the multiple display views 43a-43d, in which the captured images taken by the respective cameras 1a-1d are to be displayed, are arranged on the map image 41 representing the monitored area.

The display view indicating unit 37 performs a process of indicating in the continuous playback screen one of the display views 43a-43d in which the person designated as the target to be tracked currently appears. Specifically, in the present embodiment, the one of the display views 43a-43d in which the person designated as the target to be tracked currently appears is provided with highlighting to distinguish it from the other ones of the display views 43a-43d. More specifically, as the highlighting, a frame image 45 colored with a predetermined color is displayed such that it is located on an outer periphery of the one of the display views 43a-43d to be highlighted. In this display view indicating process, the tracing information relating to the person designated as the target to be tracked is obtained and, based on the tracing information, one of the display views 43a-43d in which the person designated as the target to be tracked currently appears is indicated.

The target-to-be-tracked indicating unit 38 performs a process of obtaining tracing information from the tracing information storing unit 22 and, based on the tracing information, indicating the person set as the target to be tracked in each of the display views 43a-43d in which the person set as the target to be tracked appears. Specifically, in the present embodiment, the image of the person set as the target to be tracked that is displayed in the display views 43a-43d is provided with highlighting to distinguish the person from the other persons. More specifically, as the highlighting, the person set as the target to be tracked is shown with a person detection frame 48 that indicates that the person is the target to be tracked. This person detection frame 48 is highlighted with a color (for example, green) that can distinguish the person detection frame 48 from the person detection frames 47 shown in association with each person detected from the captured images.

The captured image processing unit 39 performs a process of embedding the captured images obtained from the recorder 2 into the corresponding display views 43a-43d in the base screen generated by the base screen generation unit 36.

It is to be noted that the various units of the PC 3 shown in FIG. 3 are realized by executing programs for tracking assistance by the CPU of the PC3. These programs may be pre-installed in the PC 3 serving as an information processing device to embody a device dedicated to tracking assistance, or may be provided to a user in the form stored in an appropriate program recording medium as an application program that can be run on a general-purpose OS.

Figure 8:
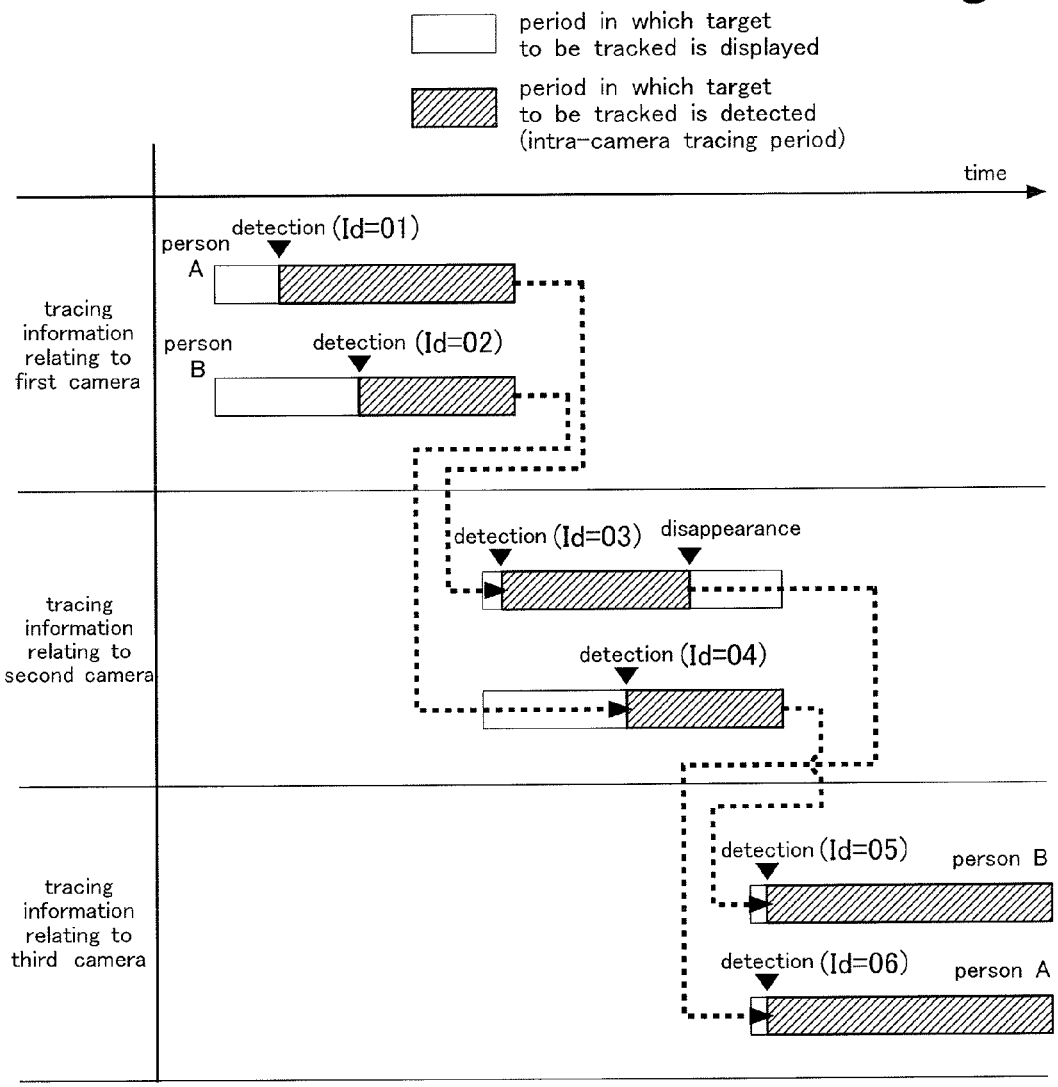
FIG. 8 is an explanatory diagram showing states of an intra-camera tracing process and an inter-camera tracing process respectively performed by an intra-camera tracing process device 4 and an inter-camera tracing processing unit 5.

Next, a description will be given of a case where an error in the tracing information occurs in the intra-camera tracing processing device 4 and the inter-camera tracing processing unit 5. FIG. 8 is an explanatory diagram showing states of the intra-camera tracing process and the inter-camera tracing process respectively performed by the intra-camera tracing process device 4 and the inter-camera tracing processing unit 5. Here, a description will be given of an example in which two persons A and B similarly move such that their images are captured by the first to third cameras 1a-1c as shown in FIG. 2.

The intra-camera tracing processing device 4 of the first camera 1a detects the persons A and B from the captured images taken by the first camera 1a and gives person IDs (Id=01, Id=02) to the persons A and B, respectively. The intra-camera tracing processing device 4 of the second camera 1b detects the persons A and B from the captured images taken by the second camera 1b and gives person IDs (Id=03, Id=04) to the persons A and B, respectively. In this example, specifically, the tracing of the person A is interrupted and it takes time to detect the person B so that the starting of the tracing of the person B is delayed. The intra-camera tracing processing device 4 of the third camera 1c detects the persons A and B from the captured image taken by the third camera 1c and gives person IDs (Id=05, Id=06) to the persons A and B, respectively.

The inter-camera tracing processing unit 5 of the PC3 performs a process of obtaining the tracing information from each of the intra-camera tracing processing devices 4 of the first-third cameras 1a-1c and associating the person(s) detected from the tracing information from the intra-camera tracing processing device 4 for one camera with the person(s) detected from the tracing information from the intra-camera tracing processing device of another camera. Specifically, in the example shown, due to the interruption and delay of the tracing caused in the intra-camera tracing processing device 4 for the second camera 1b, an error occurs in the inter-camera tracing process between the second camera 1b and the third camera 1c such that the person A and the person B are replaced with each other. In such a case, if the person A is designated as the target to be tracked on the display view 43c corresponding to the third camera 1c, the person B will be displayed as the target to be tracked in the first display view 43a and the second display view 43b corresponding to the first camera 1a and the second camera 1b, respectively.

Thus, if the tracing information obtained from the inter-camera tracing processing unit 5 includes an error, a person different from the person designated as the target to be tracked will be displayed as the target to be tracked in the display views 43a-43d, whereby it is possible to verify whether the tracing information includes an error or not. If an error is found in the tracing information by this verification, a process is performed to have the monitoring person select a correct person as the target to be tracked and to correct the tracing information accordingly.

Figure 9:
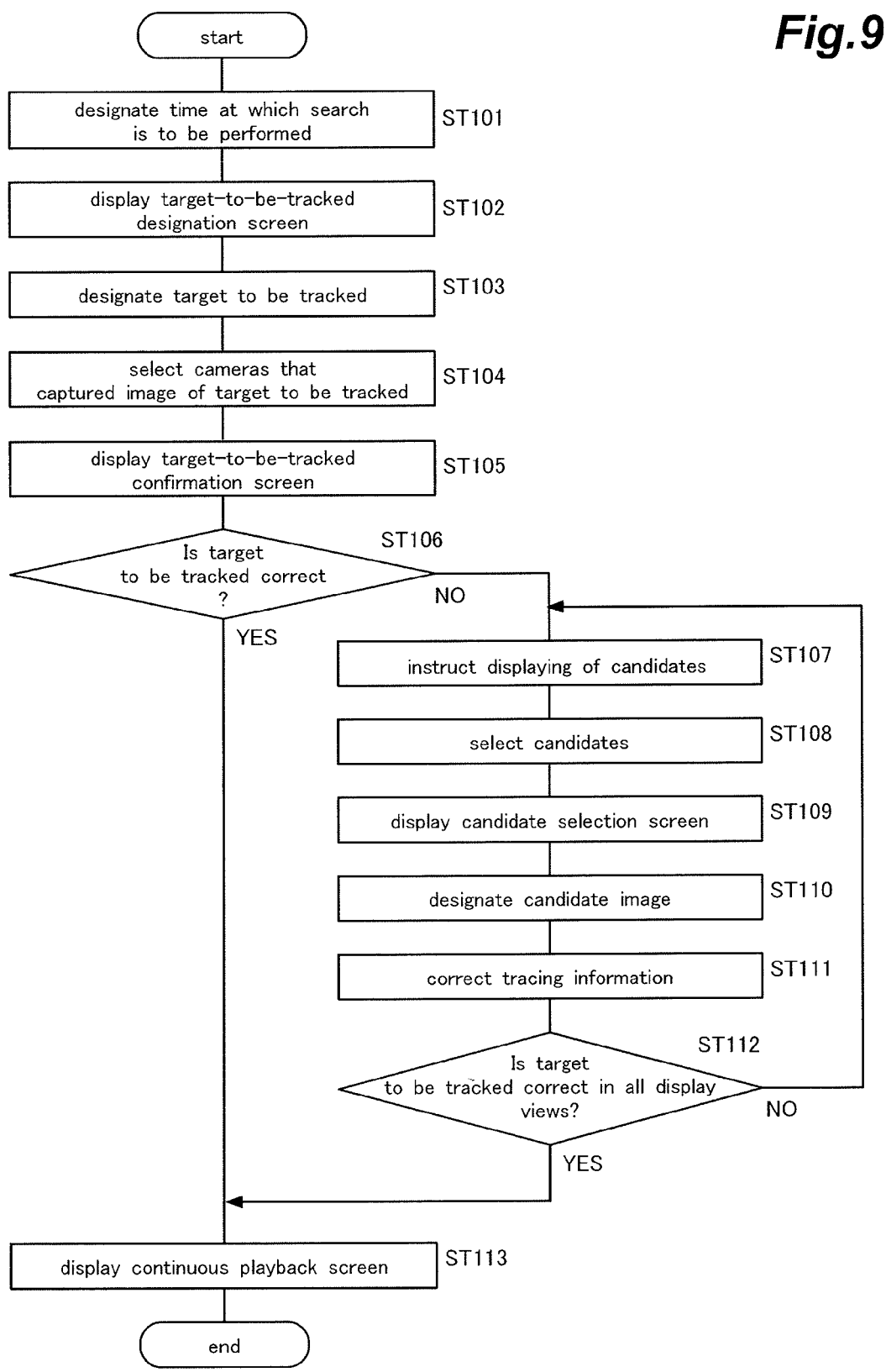
FIG. 9 is a flowchart showing a procedure of processes performed by various units of the PC 3 and operations performed by a monitoring person on various screens.

Next, a detailed description will be given of the various screens shown in FIGS. 4-7 and operations performed by the monitoring person on these screens. FIG. 9 is a flowchart showing processes performed by the various units of the PC 3 shown in FIG. 3 and operations performed by the monitoring person on the screens.

First, when an operation to start a tracking assistance process is performed, the target-to-be-tracked designation screen shown in FIG. 4 is displayed on the monitor 7, and the monitoring person performs an operation to designate a date and time on the target-to-be-tracked designation screen (ST101). An upper portion of the target-to-be-tracked designation screen is provided with entry fields for date and time, and if the monitoring person designates a date and time (year, month, day, hour, minute and second) and operates a "search" button, the captured images (still images) taken by the cameras 1a-1d at the designated date and time are displayed in the respective display views 43a-43d (ST102). It is to be noted that the date and time when the person to be tracked committed an act such as shoplifting is known, and thus, based on this date and time, a captured image in which the person to be tracked is surely included can be found.

In the target-to-be-tracked designation screen, the monitoring person performs an operation of designating a person as a target to be tracked (ST103). Specifically, the monitoring person uses the input device 6 such as a mouse to move a pointer 49 onto the image of the person desired to be tracked that is included in the captured image displayed in one of the display views 43a-43d and performs an operation for selecting the person (a clicking operation in the case of a mouse). In the example shown in FIG. 4, the person to be tracked appears (or is displayed) in the third display view 43c which corresponds to the third camera is and this person is designated as the target to be tracked.

Upon the monitoring person performing an operation to designate a person as the target to be tracked on the target-to-be-tracked designation screen as described above, the camera selection unit 24 performs a process of selecting any of the cameras 1a-1d that are inferred to have taken an image of the person designated as the target to be tracked (ST104). Then, the confirmation image presenting unit 31 of the target-to-be-tracked confirmation unit 25 performs a process of causing the monitor 7 to display the target-to-be-tracked confirmation screen shown in FIG. 5, in which are arranged confirmation images that are supposed to include the person designated as the target to be tracked (ST105).

In the target-to-be-tracked confirmation screen shown in FIG. 5, a confirmation image is displayed in each of the one(s) of the display views 43a-43d corresponding to the selected one(s) of the cameras 1a-1d, where the confirmation image displayed in one display view is an image taken by the corresponding camera and supposed to include the person designated as the target to be tracked. Namely, the confirmation image displayed in one display view is a representative image (still image) chosen from among the captured images which were taken by the corresponding camera and in which the person designated as the target to be tracked is supposed to be included. The representative image may be a captured image taken when the tracing of the person designated as the target to be tracked was started, in other words, a captured image in which the person designated as the target to be tracked was detected for the first time. In each of the display views 43a-43d in the target-to-be-tracked confirmation screen, the person detection frame 47 is displayed in association with each person (if any) in the captured image, and in particular, the person detection frame 48 indicating the target to be tracked is displayed in association with the person set as the target to be tracked.

A lower portion of the target-to-be-tracked confirmation screen is provided with a playback button, a reverse playback button, a stop button, a fast forward button and a rewind button. Upon operation of these buttons, in the display views 43a-43d, the captured images taken by the respective cameras 1a-1d are displayed as moving images, such that the captured images in which the person designated as the target to be tracked is supposed to be captured are displayed as moving images in some of the display views 43a-43d. This makes it possible for the user (monitoring person) to confirm whether the target to be tracked is correct by watching the moving images.

In a case where the tracing information relating to the person designated as the target to be tracked includes an error, a confirmation image(s) displayed in some of the display views 43a-43d in the target-to-be-tracked confirmation screen may not include the person designated as the target to be tracked, or though each confirmation image shows the person designated as the target to be tracked, the person detection frame 48 may be displayed in association with a person different from the person designated as the target to be tracked. Thus, it is possible to for the user (monitoring person) to determine whether the tracing information relating to the person designated as the target to be tracked includes an error or not by viewing the confirmation images.

If the monitoring person finds from the target-to-be-tracked confirmation screen that the target to be tracked displayed in any of the display views 43a-43d is incorrect (NO in ST106), the monitoring person instructs to display candidates for the correct target to be tracked; specifically, selects one of the display views 43a-43d in which the target to be tracked is not indicated correctly and operates a "manual search" button (ST107). Thereupon, the candidates selection unit 33 of the target-to-be-tracked correction unit 26 performs a process of selecting, as candidates, persons having a high degree of relevance with the person designated as the target to be tracked (ST108). Subsequently, the candidate image presenting unit 34 performs a process of extracting, as candidate images, captured images including respective persons selected as candidates by the candidates selection unit 33, and causing the monitor 7 to display the candidate selection screen shown in FIG. 6 (ST109).

In the candidate selection screen shown in FIG. 6, the candidate images taken by one of the cameras 1a-1d corresponding to the one of the display views 43a-43d selected as including an error on the target-to-be-tracked confirmation screen shown in FIG. 5 are displayed, where, based on the order given to the candidate persons, a predetermined number of candidate images of candidate persons of higher ranks are displayed. Specifically, in the example shown in FIG. 6, four display views 51a-51d are arranged in the candidate selection screen, in which the candidate images of the candidate persons of the first to fourth ranks are respectively displayed.

A lower portion of this candidate selection screen is provided with a "no candidate" button and a "next" button. If the "no candidate" button is operated, the screen goes back to the target-to-be-tracked confirmation screen shown in FIG. 5 without any candidate selected. If the "next" button is operated, candidate images including candidate persons of next ranks are displayed.

If, on the candidate selection screen, the monitoring person selects a candidate image including the correct person designated as the target to be tracked (ST110), a confirmation button is popup displayed, and if this confirmation button is operated, the screen returns to the target-to-be-tracked confirmation screen shown in FIG. 5. At this time, the tracing information correction unit 35 performs a process of changing the target to be tracked to the person captured in the candidate image selected on the candidate selection screen, and correcting the tracing information relating to the person designated as the target to be tracked (ST111).

Thereafter, the monitoring person checks whether the target to be tracked is correct in all of the display views 43a-43d in the target-to-be-tracked confirmation screen shown in FIG. 5 (ST112), and if it is found that there is a display view in which the target to be tracked is not correct, the monitoring person selects, on the target-to-be-tracked confirmation screen, one of the display views 43a-43d in which the target to be tracked is not indicated correctly and operates the "manual search" button (ST107), whereby the aforementioned processes and operations are repeated.

Then, if it is confirmed that the target to be tracked is correct in all of the display views 43a-43d in the target-to-be-tracked confirmation screen shown in FIG. 5, the monitoring person operates the playback button provided in the lower portion of the target-to-be-tracked confirmation screen. Thereupon, the image playback unit 27 performs a process of continuous playback in which the captured images in which the person designated as the target to be tracked is included are displayed in the display views 43a-43d sequentially along with the passage of time, whereby the continuous playback screen shown in FIG. 7 is displayed on the monitor 7 (ST113). This continuous playback is performed based on the corrected tracing information relating to the person designated as the target to be tracked, and thus, the monitoring person can see what actions were performed in the monitored area by the person designated as the target to be tracked and can confirm again whether the tracing information includes an error.

As described in the foregoing, in the present embodiment, a screen is displayed on the monitor 7 such that the screen includes a map image 41 representing the monitored area, on which multiple display views 43a-43d for displaying captured images taken by respective cameras 1a-1d are arranged in accordance with the actual arrangement of the cameras 1a-1d, and the person designated as the target to be tracked is displayed in these display views 43a-43d. This allows the monitoring person to easily check what actions were performed in the monitored area by the person designated as the target to be tracked. Particularly, the monitoring person may have less difficulty in finding, from among the multiple display views 43a-43d, those in which the person designated as the target to be tracked is displayed, and thus, the burden of the monitoring person performing the tracking task can be reduced and the tracking task can be carried out without loosing sight of the person designated as the target to be tracked. Further, even when multiple persons appear in one of the display views 43a-43d of interest, the person to be tracked can be specified uniquely, and thus, it is possible to reliably indicate the display view in which the person designated as the target to be tracked appears.

In the present embodiment, if there is an error in the tracing information relating to the person set as the target to be tracked, persons having a high degree of relevance with the person set as the target to be tracked are selected as candidates for the correct target to be tracked, and candidate images in which respective candidate persons appear are displayed in the candidate selection screen, whereby the monitoring person is only required to select a candidate image in which the person designated as the target to be tracked appears. Therefore, correction of the tracing information relating to the person designated as the target to be tracked can be made easily and the burden of the monitoring person can be reduced.

Further, in the present embodiment, based on the tracing information, confirmation images supposed to include the person set as the target to be tracked are displayed in the target-to-be-tracked confirmation screen, and thus, by checking whether each confirmation image actually includes the person designated as the target to be tracked, the monitoring person can easily determine whether the tracing information relating to the person designated as the target to be tracked includes an error.

Yet further, in the present embodiment, each of the processes performed by the camera selection unit 24, the target-to-be-tracked confirmation unit 25 and the target-to-be-tracked correction unit 26 is performed with regard to the events occurring temporally before, after, or both before and after the capture time of the target-to-be-tracked designation image on which the monitoring person designated the person to be tracked, and thus, the monitoring person can know the situation of the person designated as the target to be tracked before and/or after the time when the designation was performed.

Figure 10:
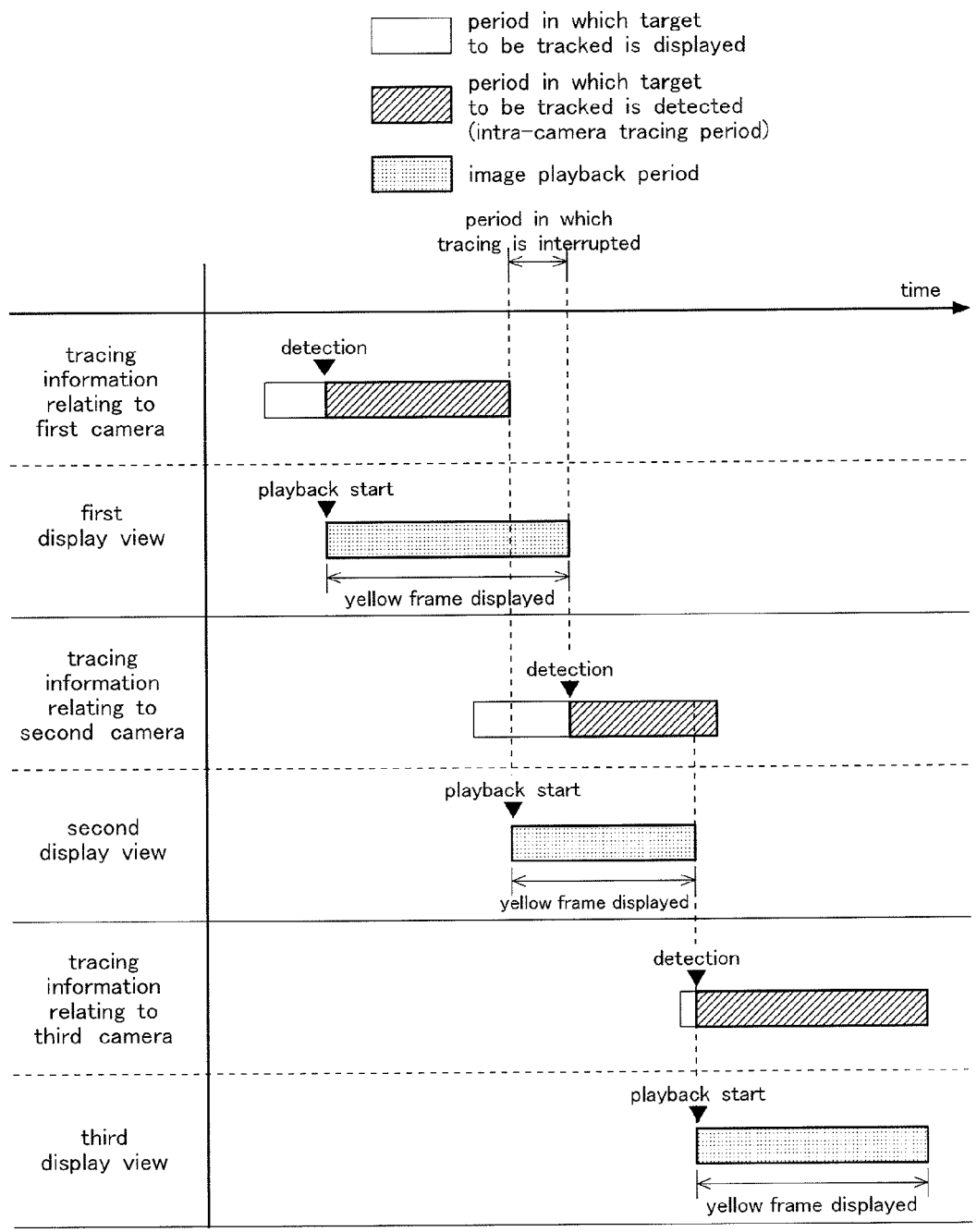
FIG. 10 is an explanatory diagram showing transition of states of a frame image for providing highlighting to a display view(s) in a continuous playback screen.

FIG. 10 is an explanatory diagram showing transition of states of the frame image 45 in the continuous playback screen shown in FIG. 7, where the frame image 45 indicates one of the display views 43a-43d in which the person designated as the target to be tracked currently appears. Here, a description will be given of an example in which the person designated as the target to be tracked moves to appear in the first display view 43a, then in the second display view 43b, and then in the third display view 43c.

As described above, in the foregoing embodiment, continuous playback can be performed such that the captured images in which the person designated as the target to be tracked is included are sequentially displayed in the multiple display views 43a-43d. As shown in FIGS. 7A-7C, in the continuous playback screen in which the continuous playback is performed, a yellow frame image 45 is displayed on one of the display views 43a-43d while the display view displays captured images in which the person designated as the target to be tracked is included.

In the example shown in FIG. 10, the timing of detection of the person and start of tracing of the person in the second camera 1b (more precisely, in the intra-camera tracing processing device 4 of the second camera 1b; similar simplification may also be made in following description) is delayed, such that there is created a period in which the tracing of the person is interrupted between the timing at which the tracing is started in the second camera 1b and the timing at which the tracing is terminated in the first camera 1a. In the present embodiment, during the period in which the tracing is interrupted, two yellow frame images 45 are displayed simultaneously on two of the display views 43a-43d that display, before and after that period, respectively, captured images in which the person designated as the target to be tracked appear. In the example shown in FIG. 10, two yellow frame images 45 are displayed simultaneously on the first display view 43a and the second display view 43b.

Further, in the example shown in FIG. 10, the timing at which the person is detected and the tracing is started in the third camera 1c is earlier than the timing at which the tracing of the person is terminated in the second camera 1b. In such a case, in the present embodiment, when the person is detected and the tracing is started in one of the cameras 1a-1d that starts capturing the image of the person designated as the target to be tracked at a later timing, image playback performed in one of the display views 43*a*-43*d* corresponding to another one of the cameras 1*a*-1*d* that has been capturing the image of the person designated as the target to be tracked prior to the start of the tracing in the one of the cameras 1*a*-1*d* and display of the frame image 45 on the one of the display views 43*a*-43*d* are stopped. Thus, in the example shown in FIG. 10, when the person is detected and the tracing is started in the third camera 1*c*, image playback in the third display view 43*c* corresponding to the third camera 1*c* and display of the frame image 45 on the display view 43*c* are started, while at the same time, image playback in the second display view 43*b* corresponding to the second camera 1*b* and display of the frame image 45 on the second display view 43*b* are stopped.

As described above, in the present embodiment, continuous playback is performed such that the captured images in which the person designated as the target to be tracked is included are displayed sequentially in the multiple display views 43*a*-43*d*, whereby the person designated as the target to be tracked can be tracked continuously in the multiple display views 43*a*-43*d*. Therefore, the monitoring person can know easily what actions were performed in the monitored area by the person designated as the target to be tracked.

Particularly, in the present embodiment, the continuous playback screen in which the continuous playback is performed is adapted to display a frame image 45 in association with one of the display views 43*a*-43*d* in which the person designated as the target to be tracked currently appears, whereby the one of the display views 43*a*-43*d* in which the person designated as the target to be tracked appears can be found at a glance. This can save the time to find, from among the multiple display views 43*a*-43*d*, the one in which the person designated as the target to be tracked currently appears, and therefore, the burden of the monitoring person performing the tracking task can be reduced and the tracking task can be carried out smoothly without losing sight of the person designated as the target to be tracked.

When tracing of the person designated as the target to be tracked is interrupted in the tracing process performed by the intra-camera tracing processing devices 4 and the inter-camera tracing processing unit 5, one of the display views 43*a*-43*d* in which the person designated as the target to be tracked currently appears cannot be identified. In such a case, it is highly probable that the person designated as the target to be tracked appears in one or both of the two of the display views 43*a*-43*d* that display the person before and after the period in which the tracing is interrupted, respectively, and therefore, in the present embodiment, frame images 45 are displayed simultaneously on the two of the display views 43*a*-43*d*. This allows the monitoring person to carry out the tracking task smoothly without losing sight of the person to be tracked.

Figure 11:
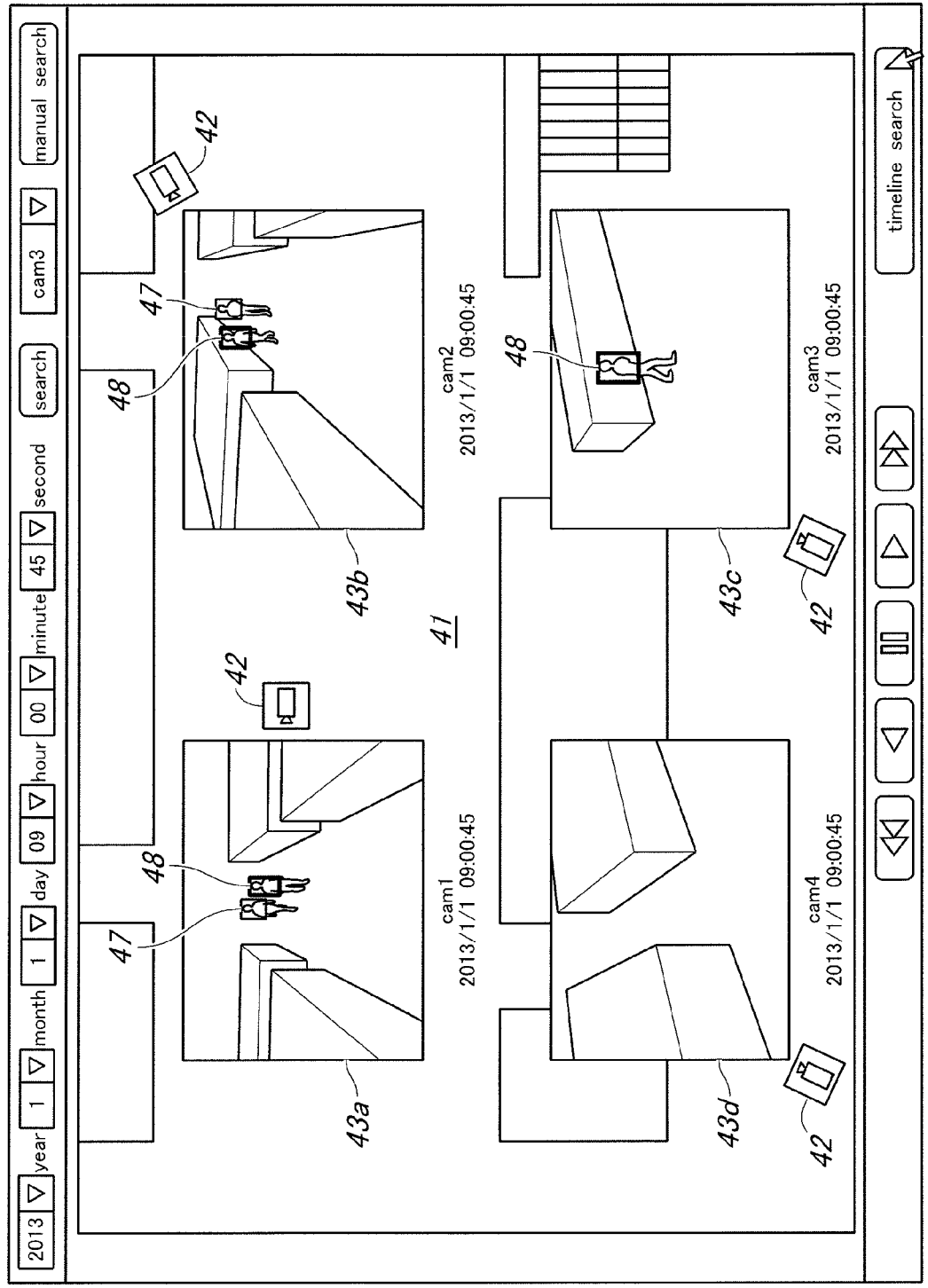
FIG. 11 is an explanatory diagram showing a target-to-be-tracked confirmation screen to be displayed on the monitor 7.
Figure 12:
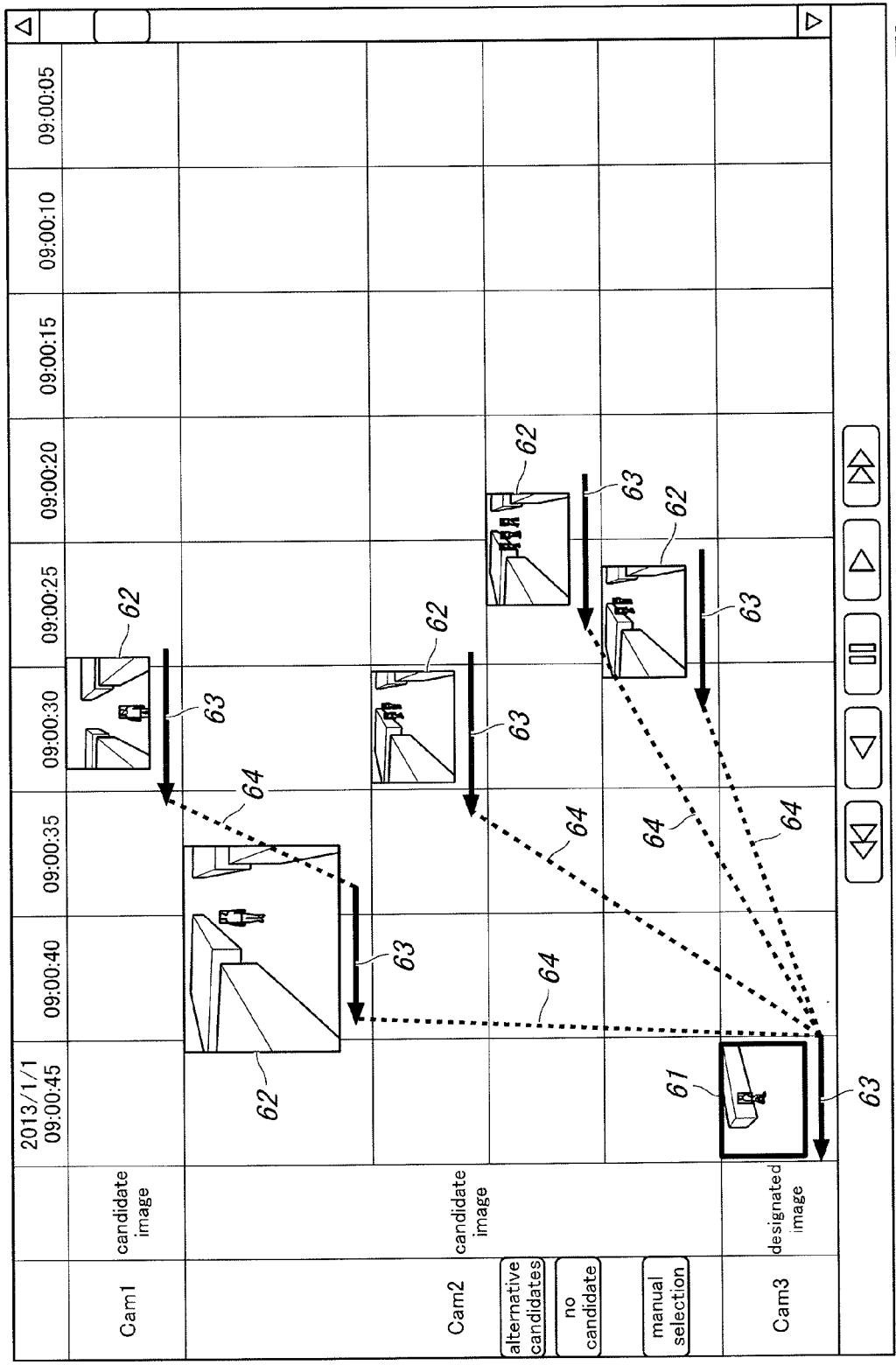
FIG. 12 is an explanatory diagram showing a candidate selection screen to be displayed on the monitor 7.
Figure 13:
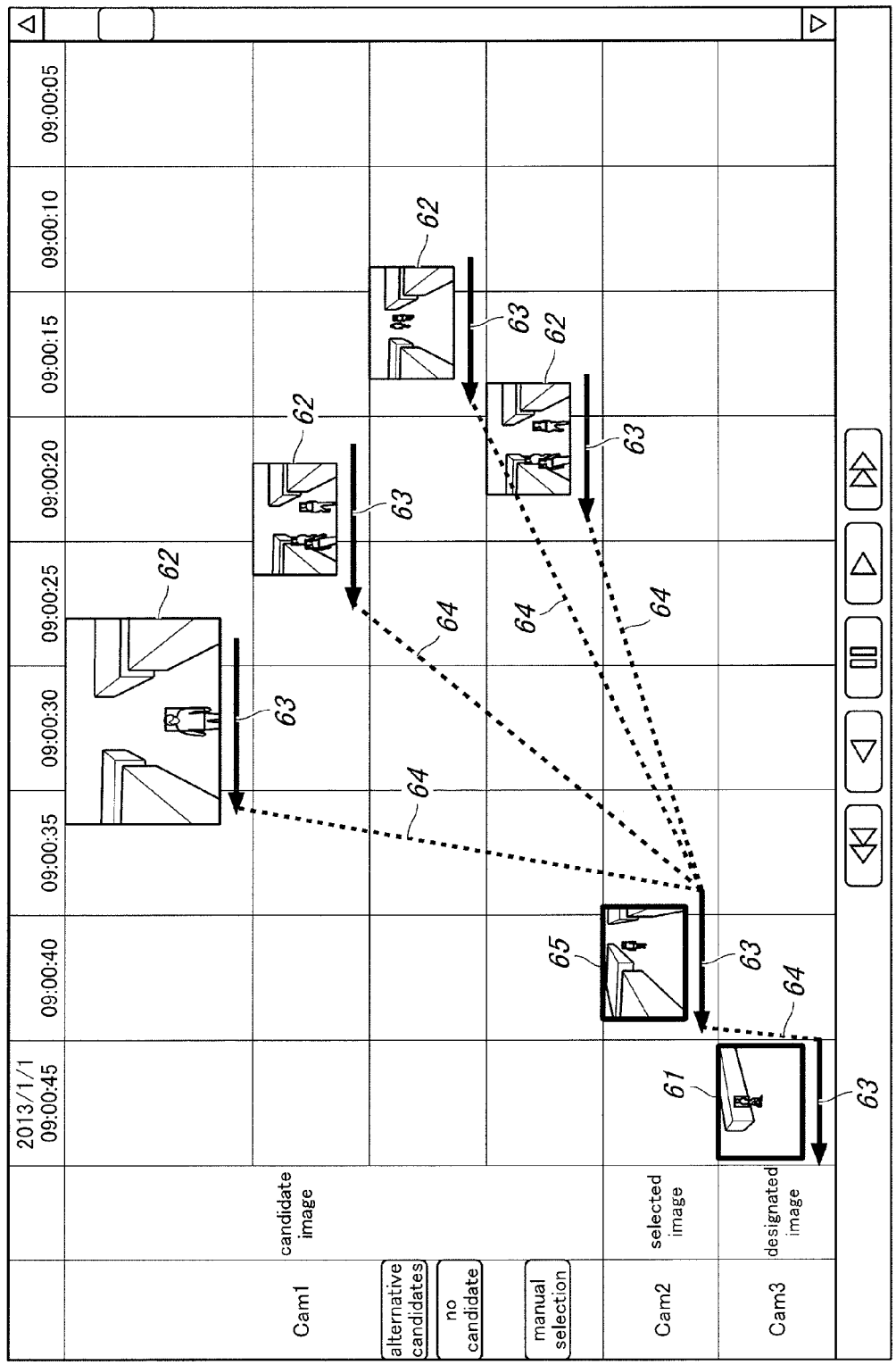
FIG. 13 is an explanatory diagram showing a candidate selection screen to be displayed on the monitor 7.
Figure 14:
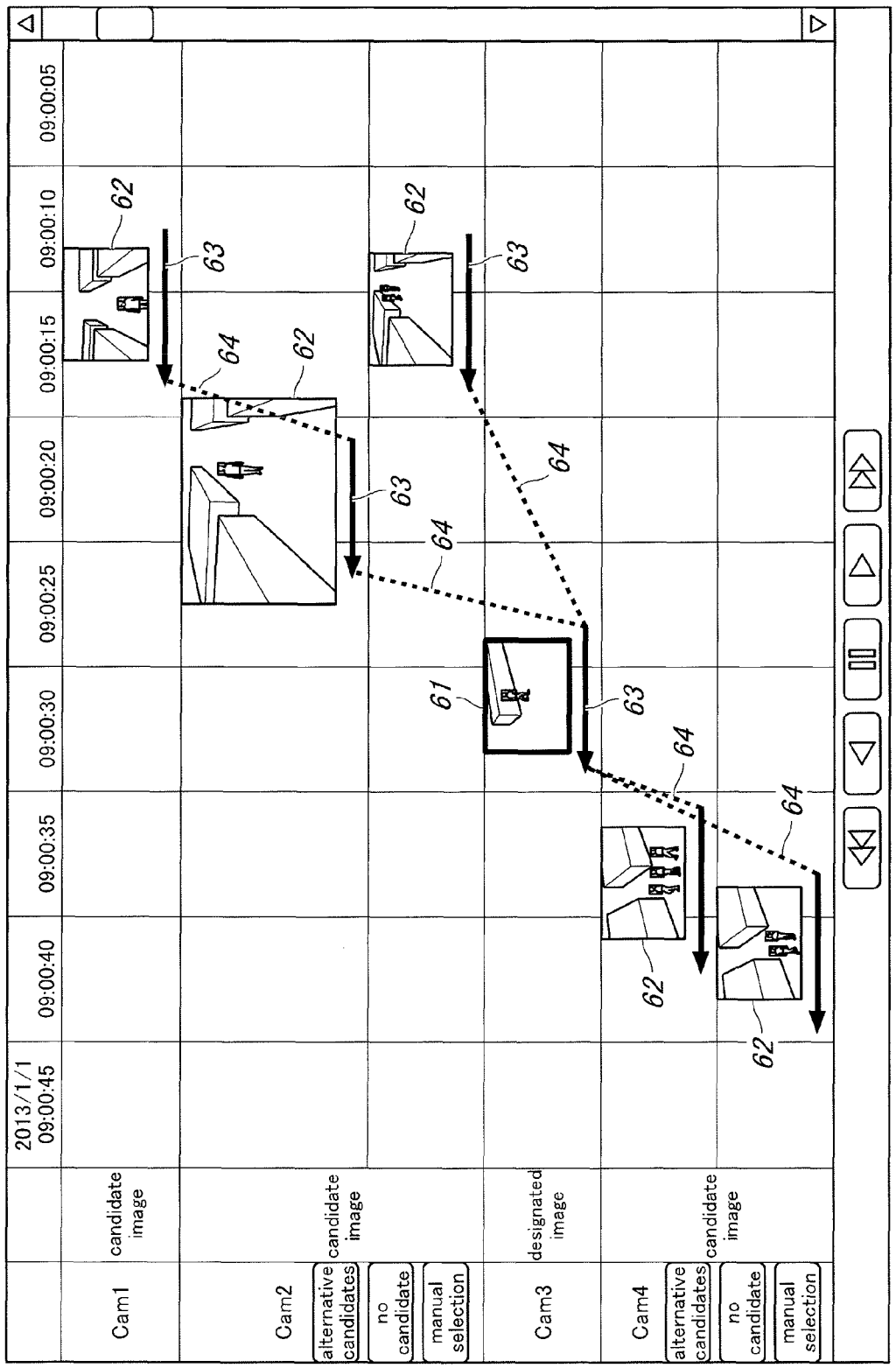
FIG. 14 is an explanatory diagram showing a candidate selection screen to be displayed on the monitor 7.

Next, a description will be given of another embodiment of the target-to-be-tracked confirmation screen and the candidate selection screen to be displayed on the monitor 7. FIG. 11 is an explanatory diagram showing a target-to-be-tracked confirmation screen to be displayed on the monitor 7. FIGS. 12-14 are explanatory diagrams each showing a candidate selection screen to be displayed on the monitor 7. It is to be noted that this embodiment is the same as the foregoing embodiment except for the points mentioned in the following description.

The target-to-be-tracked confirmation screen shown in FIG. 11 is displayed when the person to be tracked is designated on the target-to-be-tracked designation screen shown in FIG. 4. This target-to-be-tracked confirmation screen is substantially the same as that shown in FIG. 5, except that a "timeline search" button is displayed in a lower portion of this target-to-be-tracked confirmation screen. Similarly to the example shown in FIG. 5, when the monitoring person checks whether the target to be tracked is correct on this target-to-be-tracked confirmation screen and it is found that the target to be tracked is not correct, the monitoring person operates the "timeline search" button. Thereupon, the candidate selection screens shown in FIGS. 12-14 is displayed.

In the candidate selection screens shown in FIGS. 12-14, a target-to-be-tracked designation image 61 on which the monitoring person designated a person to be tracked and multiple candidate images 62 in which persons selected as candidates for the target to be tracked are respectively included are arranged in the order of capture time. Specifically, in the present embodiment, the target-to-be-tracked designation image 61 and the candidate images 62 are grouped based on the cameras 1*a*-1*d* by which they were captured and are arranged in the order of capture time.

Further, in the candidate selection screen shown in FIGS. 12-14, the candidate image 62 of a candidate person with the highest rank, namely, a candidate person having the highest degree of relevance with the person designated as the target to be tracked is given a larger size than that of the other candidate images 62.

In the example shown in FIGS. 12-14, candidate images 62 having different capture times are arranged in the horizontal direction and different groups of candidate images 62 corresponding to respective cameras 1*a*-1*d* are arranged in the vertical direction. However, the vertical and horizontal directions may be switched; namely, a configuration may be made such that candidate images 62 having different capture times are arranged in the vertical direction and different groups of candidate images 62 corresponding to respective cameras 1*a*-1*d* are arranged in the horizontal direction. Further, in the example shown in FIGS. 12-14, the indication of capture time is designed such that time goes backward from left to right. However, the indication of capture time may be designed such that time goes forward from left to right, and the arrangement of the target-to-be-tracked designation image 61 and the candidate images 62 may be changed accordingly.

The candidate selection screen shown in FIG. 12 is displayed first when, after the person to be tracked is designated on the target-to-be-tracked designation screen shown in FIG. 4, the "timeline search" button in the target-to-be-tracked confirmation screen shown in FIG. 11 is operated. In the illustrated example, displayed in the candidate selection screen shown in FIG. 12 is the target-to-be-tracked designation image 61 that was displayed when the display view 43*c* corresponding to the third camera 1*c* was designated to select the person designated as the target to be tracked. Further, a candidate image 62 relevant to the first camera 1*a* and multiple candidate images 62 relevant to the second camera 1*b* are also displayed, as no selection has been made yet with regard to the candidate images 62 relevant to the first camera 1*a* and the second camera 1*b*.

The candidate selection screen shown in FIG. 13 is displayed when one of the candidate images 62 relevant to the second camera 1*b* is selected on the candidate selection screen shown in FIG. 12. In the illustrated example, displayed in the candidate selection screen shown in FIG. 13 are the target-to-be-tracked designation image 61 relevant to the third camera 1*c* and a selected image 65, which is one of the candidate images 62 relevant to the second camera 1*b* selected on the candidate selection screen shown in FIG. 12. Further, multiple candidate images 62 relevant to the first camera 1 are displayed as no selection has been made yet with regard to the candidate images 62 relevant to the first camera 1*a*.

It is to be noted that the candidate selection screens shown in FIG. 12 and FIG. 13 are displayed when the cameras 1a-1d include only those that captured images of the person designated as the target to be tracked temporally prior to the capture time of the target-to-be-tracked designation image 61 displayed in the display view on which the person was designated as the target to be tracked, and in a case where the cameras 1a-1d include those that captured images of the person designated as the target to be tracked temporally after the capture time of the target-to-be-tracked designation image 61 displayed in the display view on which the person was designated as the target to be tracked, the candidate selection screen shown in FIG. 14 is displayed.

In the candidate selection screen shown in FIG. 14, in addition to the target-to-be-tracked designation image 61 relevant to the third camera 1c and the candidate images 62 relevant to the first camera 1a and the second camera 1b, which have capture times earlier than that of the target-to-be-tracked designation image 61, another candidate image 62 relevant to the fourth camera 1d and having a capture time later than that of the target-to-be-tracked designation image 61 is displayed.

Thus, in the present embodiment, the candidate images 62 taken by some of the cameras 1a-1d (cameras 1a and 1b in the example shown in FIG. 14) temporally prior to the capture time of the target-to-be-tracked designation image 61 and the candidate images 62 taken by another some of the cameras 1a-1d temporally after the capture time of the target-to-be-tracked designation image 61 are displayed, and thus, the monitoring person can grasp the state of movement of the person both before and after the capture time of the target-to-be-tracked designation image 61.

Further, in the candidate selection screens shown in FIGS. 12-14, an arrow image 63 is displayed at a position associated with each of the target-to-be-tracked designation image 61, candidate images 62 and selected image 65 (in the illustrated example, at a position under each image) to represent the tracing period of the person designated as the target to be tracked or the person selected as a candidate, namely, a period from when the tracing is started upon detection of the person in the captured image to when the tracing is terminated. This arrow image 63 is designed such that the start point of the arrow corresponds to the tracing start time and the end point of the arrow corresponds to the tracing end time.

Thus, in the present embodiment, the tracing period of the person designated as the target to be tracked, who is included in each of the target-to-be-tracked designation image 61 and the selected image 65, and the tracing period of each candidate person included in the respective one of the candidate images 62 are visually indicated by the arrow images 63, and this makes it possible to judge at a glance the relevance between the person designated as the target to be tracked, who is included in each of the target-to-be-tracked designation image 61 and the selected image 65, and each candidate person included in the respective one of the candidate images 62.

In addition, in the candidate selection screens shown in FIGS. 12-14, line images 64 (in the illustrated example, dotted line images) are displayed to connect the arrow images 63 relevant to one of any two of the cameras 1a-1d adjoining each other on the path of movement of the person with the arrow images 63 relevant to the other of the two cameras, where each arrow image 63 is displayed in association with the target-to-be-tracked designation image 61, candidate image 62 or selected image 65, as described above. Specifically, in the example shown in FIGS. 12-14, each line image 64 is displayed to connect the start point of the arrow image 63 associated with an image captured earlier on the path of movement of the person with the end point of the arrow image 63 associated with an image captured later on the path of movement of the person.

These line images 64 make it possible to judge at a glance the relevance between the person designated as the target to be tracked, who is included in each of the target-to-be-tracked designation image 61 and the selected image 65, and each candidate person included in the respective one of the candidate images 62. Namely, it can be judged that the larger the angle of the line image 64 (an angle formed relative to the arrow image 63) is, the temporally closer the two images are to each other and the higher the relevance between the persons included in these images is.

Further, in the candidate selection screens shown in FIGS. 12-14, the candidate images 62 are displayed as still images in the initial state, and when the playback button provided in the lower portion of the candidate selection screen is operated, the captured images taken during the respective tracing period of the candidate person included in each candidate image 62 are displayed as moving images in the display section for the candidate image 62. In addition, when the display section for a given candidate image 62 is operated, a popup screen having a larger size is displayed, and the captured images are displayed as moving images in the popup screen, so that the user can see the candidate person in the screen having a larger size.

In addition, an "alternative candidates" button, a "no candidate" button and a "manual search" button are provided in the candidate selection screen shown in FIGS. 12-14. The "alternative candidates" button is to be operated when the person to be tracked is not found in the currently displayed candidate images 62 and it is desired to display the candidate images including candidate persons of next ranks. The "no candidate" button is provided to terminate the process of selecting a suitable one of the candidate images 62 without selecting one, when there is no suitable candidate image 62. The "manual search" button is provided for causing the candidate selection screen shown in FIG. 6 to be displayed in place of the candidate selection screens shown in FIGS. 12-14.

As described above, in the present embodiment, the target-to-be-tracked designation image 61 on which the monitoring person made a selection of the person designated as the target to be tracked and the multiple candidate images 62 in which persons selected as candidates for the target to be tracked are respectively included are arranged in the order of capture time in the candidate selection screen. This makes it possible to judge at a glance the relevance between the person designated as the target to be tracked included in the target-to-be-tracked designation image 61 and each candidate person included in the respective one of the candidate images 62, whereby selection of a candidate image 62 can be made easily.

Specifically, in the present embodiment, the target-to-be-tracked designation image 61 and the candidate images 62 are grouped based on the cameras 1a-1d by which they were captured and are arranged in the order of capture time in the candidate selection screen. This makes it possible to judge the relevance between the person designated as the target to be tracked included in the target-to-be-tracked designation image 61 and each candidate person included in the respective one of the candidate images 62 by taking into account the cameras 1a-1d that captured these images, whereby selection of a candidate image 62 can be made even more easily.

Further, in the present embodiment, the arrow images 63 each representing the tracing period of the person designated as the target to be tracked or the person selected as a candidate are displayed in the candidate selection screen. This allows the monitoring person to grasp at a glance the tracing period of the person designated as the target to be tracked who is included in the target-to-be-tracked designation image 61 and the tracing period of each candidate person included in the respective one of the candidate images 62, whereby selection of a candidate image can be made even more easily.

Yet further, in the present embodiment, the captured images are displayed as still images in the initial state of the candidate selection screen, and upon an instruction operation by the monitoring person, the captured images are displayed as moving images. Therefore, when desired, it is possible to check by moving images whether each candidate image includes the person designated as the target to be tracked, whereby selection of a candidate image can be made even more easily.

In the foregoing, the present invention has been described in terms of concrete embodiments thereof. However, these embodiments are provided for illustrative purposes and the present invention is not limited by the embodiments. It is also to be noted that not all of the structural elements of the tracking assistance device, tracking assistance system and tracking assistance method as shown in the embodiments of the present invention are necessarily indispensable, and they may be selectively used as appropriate without departing from the spirit of the present invention.

For example, in the foregoing embodiments, a description was made of an exemplary case in which the invention was applied to a retail store such as a supermarket. However, the present invention may be applied to a commercial establishment other than a retail store, such as a restaurant, which can be a casual dining restaurant, etc. Further, the present invention may be applied to a facility other than a commercial establishment, such as a plant or the like.

Further, in the foregoing embodiments, a description was given of an example in which a person was tracked as a moving object. However, a configuration can be made to track a moving object other than a person, such as a vehicle, which may be an automobile, bicycle, etc.

Further, in the foregoing embodiments, a description was given of an example in which four cameras 1a-1d are mounted and four display views 43a-43d for respectively displaying the captured images taken by the cameras 1a-1d are arranged in the screen, but the number of the cameras 1a-1d and that of the display views 43a-43d are not limited thereto. The configuration according to the foregoing embodiments can be particularly advantageous for a larger number of the display views 43a-43d.

Further, in the foregoing embodiments, to highlight the display views 43a-43d in the monitoring screen, the frame images 45 colored with predetermined colors are each displayed on an outer periphery of one of the display views 43a-43d to be highlighted, but highlighting is not limited to such an embodiment, and it is possible to display a predetermined image such as a mark inside of in the vicinity of a desired one of the display views 43a-43d and/or display an image of an arrow connecting two of the display views 43a-43d.

Further, in the foregoing embodiments, description was made of an example in which the intra-camera tracing process was performed by the intra-camera tracing processing devices 4 and the inter-camera tracing process and the tracking assistance process were performed by the PC 3 as shown in FIG. 3. However, the intra-camera tracing process may also be performed by the PC 3. It is also possible to configure each of the cameras 1a-1d to include an intra-camera tracing process unit. Further, the inter-camera tracing processing unit 5 may be configured as a tracing processing device separate from the PC 3. Still further, each of the cameras 1a-1d was shown in the drawings as a box style camera having a limited view angle. However, the cameras 1a-1d are not limited thereto and it is also possible to use an omnidirectional camera(s) which can capture a wide-range image.

Further, in the foregoing embodiments, the intra-camera tracing process, inter-camera tracing process and tracking assistance process were performed by a device set up at the store, but these processes may be performed by the PC 11 set up at the management office or a cloud computer 12 forming a cloud computing system, as shown in FIG. 1. Further, these necessary processes may be performed by cooperation of multiple information processing devices, in which case, the multiple information processing devices are configured to be able to communicate or share information with each other via a communication medium such as an IP network or LAN or a storage medium such as a hard disk and a memory card. Thereby, the multiple information processing devices jointly executing the necessary processes constitute a tracking assistance system.

In this case, it is preferred that the device set up at the store be configured to perform at least the intra-camera tracing process or the inter-camera tracing process. In such a structure, since the information obtained by the intra-camera tracing process or the inter-camera tracing process has a small amount of data, even if the remaining processes are performed by an information processing device set up at a place other than the store, such as the PC 11 set up at the management office, the communication load can be small, and thus, it is easy to operate the system in the form of a wide area network.

It may be also preferred that the cloud computer 12 be configured to perform at least the intra-camera tracing process or the inter-camera tracing process. In such a structure, although the intra-camera tracing process and the inter-camera tracing process require a large amount of computation, they are achieved by the information processing device constituting a cloud computing system, and therefore, it is not necessary to prepare a high-speed information processing device on the use side, namely at the store or the like. Further, since the remaining processes require a small amount of computation, the remaining processes can be performed as extended functions of an information processing device set up at the store to serve as a sales information management device, and this can reduce the cost born by the user.

The cloud computer 12 may be configured to perform the entirety of the necessary processes. In such a structure, it becomes possible to view the tracking state on a mobile terminal such as a smartphone 13 in addition to the PC 3 set up at the store and the PC 11 set up at the management office, and this allows a user to view the tracking state not only at the store or the management office but also at any other place, such as a place the user is visiting on business.

The tracking assistance device, tracking assistance system and tracking assistance method according to the present invention can properly perform an assistance process to reduce the burden of a monitoring person in tracking a specific person while watching captured images taken by multiple cameras and displayed in the screen of a display device, so that the monitoring person can continue tracking without losing sight of the person being monitored, and thus, are useful as a tracking assistance device, a tracking assistance system and a tracking assistance method for assisting a monitoring person in tracking a moving object to be tracked by displaying on a display device a screen in which multiple display sections are arranged to display the captured images taken by respective cameras and stored in the image storing device.

The invention claimed is:

1. A tracking assistance device for assisting a monitoring person in performing a task of tracking a moving object to be tracked, by displaying a screen on a display device, the screen including a plurality of display views displaying captured images taken by respective cameras and stored in an image storage, the plurality of display views being arranged on a map image representing a monitored area in accordance with an actual arrangement of the cameras, the tracking assistance device comprising:
  a target-to-be-tracked setter that causes the captured images stored in the image storage to be displayed in the plurality of display views in accordance with a specified search condition, including a capture time, and, in response to an input operation performed by the monitoring person on one of the plurality of display views to designate a moving object to be tracked, sets the designated moving object as a target to be tracked;
  a camera selector that, based on tracing information obtained by processing the captured images, selects at least one camera inferred to have taken an image of the moving object designated as the target to be tracked, from the cameras other than a camera corresponding to the display view on which the target to be tracked was designated;
  a confirmation image presenter that extracts a confirmation image, based on the tracing information relating to the moving object set as the target to be tracked, from the captured images taken by each of the at least one camera selected by the camera selector, and causes the display device to display a target-to-be-tracked confirmation screen including the confirmation image, the confirmation image comprising a captured image taken by each of the at least one camera selected by the camera selector when tracing of the moving object started and supposed to include the moving object; and
  a playback device that performs a continuous playback in which the captured images from which the confirmation image is extracted by the confirmation image presenter are displayed in the plurality of display views sequentially along with passage of time.

2. The tracking assistance device according to claim 1, further comprising a screen generator including:
  a target-to-be-tracked indicator that provides a first highlighting to highlight a moving object frame associated with the moving object set as the target to be tracked; and
  a display view indicator that provides a second highlighting to highlight a display frame associated with the display view in which the moving object set as the target to be tracked currently appears in a continuous playback screen in which the continuous playback is performed.

3. The tracking assistance device according to claim 1, wherein, when tracing of the moving object set as the target to be tracked is interrupted in the tracing information, the display view indicator simultaneously indicates two of the display views that display captured images including the moving object set as the target to be tracked respectively before and after a period in which the tracing is interrupted.

4. The tracking assistance device according to claim 1, further comprising:
  a candidates selector that, when there is an error in the tracing information relating to the moving object set as the target to be tracked, selects, as a candidate, a moving object having a high degree of relevance with the moving object set as the target to be tracked based on the tracing information;
  a candidate image presenter that extracts, as a candidate image, a captured image in which the moving object selected as the candidate is included, and causes the display device to display a candidate selection screen in which the candidate image is arranged such that the monitoring person selects on the candidate selection screen a candidate image in which the moving object designated as the target to be tracked is included; and
  a tracing information corrector that changes the target to be tracked to the moving object included in the candidate image selected on the candidate selection screen, and corrects the tracing information relating to the moving object designated as the target to be tracked.

5. The tracking assistance device according to claim 1, wherein processes performed by the camera selector and the playback device are performed with regard to events occurring before, after, or both before and after a capture time of a target-to-be-tracked designation image on which the monitoring person designated the moving object to be tracked.

6. A tracking assistance system for assisting a monitoring person in performing a task of tracking a moving object to be tracked by displaying a screen on a display device, the screen including a plurality of display views displaying captured images taken by respective cameras and stored in an image storage, the plurality of display views being arranged on a map image representing a monitored area in accordance with an actual arrangement of the cameras, the tracking assistance system comprising:
  the cameras that take images of the monitored area;
  the display device that displays the screen; and
  a plurality of information processing devices,
  wherein the plurality of information processing devices jointly include:
  a tracing processor that traces a moving object detected from the captured images taken by the cameras and generates tracing information of the moving object;
  a target-to-be-tracked setter that causes the captured images stored in the image storage to be displayed in the plurality of display views in accordance with a specified search condition, including a capture time and, in response to an input operation performed by the monitoring person on one of the plurality of display views to designate a moving object to be tracked, sets the designated moving object as a target to be tracked;
  a camera selector that, based on the tracing information obtained from the tracing processor, selects at least one camera inferred to have taken an image of the moving object designated as the target to be tracked, from the cameras other than a camera corresponding to the display view on which the target to be tracked was designated;
  a confirmation image presenter that extracts a confirmation image, based on the tracing information relating to the moving object set as the target to be tracked, from the captured images taken by each of the at least one camera selected by the camera selector, and causes the display device to display a target-to-be-tracked confirmation screen including the confirmation image, the confirmation image comprising a captured image taken by each of the at least one camera selected by the camera selector when tracing of the moving object was started and supposed to include the moving object; and
  a playback device that performs continuous playback in which the captured images from which the confirmation image is extracted by the confirmation image presenter are displayed in the plurality of display views sequentially along with passage of time.

7. A tracking assistance method for assisting a monitoring person in performing a task of tracking a moving object to be tracked by displaying a screen on a display device, the screen including a plurality of display views displaying captured images taken by respective cameras and stored in an image storage, the plurality of display views being arranged on a map image representing a monitored area in accordance with an actual arrangement of the cameras, the method comprising:

causing the captured images stored in the image storage to be displayed in the plurality of display views in accordance with a specified search condition, including a capture time, and, in response to an input operation performed by the monitoring person on one of the plurality of display views to designate a moving object to be tracked, setting the designated moving object as a target to be tracked;

selecting, based on tracing information obtained by processing the captured images, at least one camera inferred to have taken an image of the moving object designated as the target to be tracked, from the cameras other than a camera corresponding to the display view on which the target to be tracked was designated;

extracting a confirmation image based on the tracing information relating to the moving object set as the target to be tracked, from the captured images taken by each of the selected at least one camera, and causing the display device to display a target-to-be-tracked confirmation screen including the confirmation image, the confirmation image comprising a captured image taken by each of the selected at least one camera when tracing of the moving object started and supposed to include the moving object; and performing a continuous playback in which the captured images from which the confirmation image is extracted are displayed in the plurality of display views sequentially along with passage of time.

\* \* \* \* \*